HENDRIK C.A. VAN DUUREN
INVENTOR
BY Hugh A. Kirk
HIS ATTORNEY

| | | ELEMENTS OF ONE EIGHT UNIT SIGNAL | I | II | III | IV | V | VI | VII | VIII | |
|---|---|---|---|---|---|---|---|---|---|---|---|
| | | | START | (TRAFFIC 1 | 2 | 3 | SIGNALS 4 | 5) | SPEC. SIGNAL | STOP | |
| INCOMPLETE SIGNALS | | START | + | | | | | | | | ALWAYS TOGETHER IN EACH EIGHT UNIT SIGNAL |
| | | STOP | | | | | | | | — | |
| | | WARNING (W) | + | | | | | | + | — | |
| | | CORRECT (OK) | + | | | | | | — | — | |
| | | IDLE TIME | + | + | + | + | + | + | (±) | — | |
| | | TRAFFIC | + | (±) | (±) | (±) | (±) | (±) | (±) | — | |
| | | DRIVING STARTING | + | + | + | + | + | + | + | — | |

+ = SPACE
— = MARK

FIG. 4

| | | I | II | III | IV | V | VI | VII | VIII |
|---|---|---|---|---|---|---|---|---|---|
| INCOMPLETE SIGNALS | STATION CODE | | (±) | | (±) | | (±) | | |
| | PRE-SELECTOR CONTROL | | | + | | — | | | |
| | STATION Nº 1 | | + | | + | | — | | |
| | " Nº 2 | | + | | — | | + | | |
| | " Nº 3 | | — | | + | | + | | |
| | " Nº 4 | | — | | — | | + | | |
| | " Nº 5 | | — | | + | | — | | |
| | " Nº 6 | | + | | — | | — | | |
| | " Nº 7 | | — | | — | | — | | |
| | STATION Nº 8 | | + | + | + | — | + | | |

REPEATING CALL SIGNALS FOR AN EIGHT STATION NETWORK

FIG. 5

HENDRIK C. A. VAN DUUREN
INVENTOR

BY Hugh A Kirk
HIS ATTORNEY

HENDRIK C.A. VAN DUUREN
INVENTOR
BY Hugh A Kirk
HIS ATTORNEY

HENDRIK C.A. VAN DUUREN
INVENTOR
BY Hugh A. Kirk
HIS ATTORNEY

HENDRIK C.A. VAN DUUREN
INVENTOR
BY Hugh A Kirk
HIS ATTORNEY

Sept. 3, 1957 H. C. A. VAN DUUREN 2,805,278

TELEGRAPH SYSTEM

Filed Oct. 15, 1951 10 Sheets-Sheet 6

HENDRIK C.A. VAN DUUREN
INVENTOR

BY Hugh A. Kirk

HIS ATTORNEY

Sept. 3, 1957 H. C. A. VAN DUUREN 2,805,278

TELEGRAPH SYSTEM

Filed Oct. 15, 1951 10 Sheets-Sheet 7

HENDRIK C. A. VAN DUUREN
INVENTOR

BY Hugh A. Kirk
HIS ATTORNEY

TELEGRAPH SYSTEM

Filed Oct. 15, 1951

HENDRIK C. A. VAN DUUREN
INVENTOR

BY Hugh A. Kirk
HIS ATTORNEY

Sept. 3, 1957 H. C. A. VAN DUUREN 2,805,278

TELEGRAPH SYSTEM

Filed Oct. 15, 1951 10 Sheets-Sheet 9

HENDRIK C. A. VAN DUUREN
INVENTOR

BY Hugh A Kirk
HIS ATTORNEY

HENDRIK C.A. VAN DUUREN
INVENTOR
BY Hugh A. Kirk
HIS ATTORNEY 2,805,278

TELEGRAPH SYSTEM

Hendrik C. A. van Duuren, The Hague, Netherlands, assignor to De Staat der Nederlanden, Ten Deze Vertegenwoordigd Door de Directeur-Generaal der Posterijen, Telegrafie en Telefonie, The Hague, Netherlands Application October 15, 1951, Serial No. 251,270

31 Claims. (Cl. 178—2)

This invention relates to electrical communication systems of the constant length time division type. More particularly, it deals with telegraph systems of the type-printing class, both for link and for network operations. This invention especially pertains to transmission disturbances, such as arise in radio transmission due to static and fading, as well as with wire transmission systems due to atmospheric disturbances, induction from adjacent lines, etc.

This invention is also an improvement over the following United States Patents No. 2,313,980 issued March 16, 1943, and No. 2,703,361 issued on March 1, 1955, each having to do with the automatic correction of mutilated communication signals.

Previously, error protection and automatic correction telegraph systems employed means for sending each signal twice, once on the spacing and once on the marking frequency and then collating the two signals. Other systems employed a constant ratio between the elements of each signal, such as an even number of marking and spacing units or elements in each signal, which also generally required equipment for the conversion of the standard telegraph code into the constant ratio code for transmission and then reconversion of the constant ratio code signals back to the standard telegraph code. Furthermore, previous systems often required the stopping of traffic in both directions until the error transmitted in one direction had been automatically corrected.

It is an object of this invention to produce a simple, efficient, effective, economic and improved rapidly acting mutilation reduction and automatic error correction electrical communication system of the constant length division type.

Another object is to produce such a communication system in which the possibility of mutilation or error are materially reduced and when they do occur they are immediately and automatically corrected.

Another object is to produce such a system for telegraph communication without conversion and/or reconversion of the standard five unit Baudot code of marking and spacing elements.

Another object is to produce such a two-way system in which mutilation or error in the signal and its correction, transmitted in one direction will not retard, stop or interfere with the signals being transmitted in the other direction.

Another object is to transmit in both directions at all times between two stations a special signal element with each traffic signal whereby both correct transmission and error or mutilation in transmission of each signal are immediately indicated to each transmitting station.

Another object is to keep a plurality of stations in a network in synchronism with each other at all times.

Another object is to convert each element of each signal into frequency or time modulated pulses, which pulses are further modulated on a high frequency electromagnetic carrier wave.

Another object is to provide automatic selection of any one of a group of stations in a network of stations by means of special call signals transmitted over the regular traffic signal channels of spacing and marking elements.

Another object is to provide means to indicate the absence of or the simultaneous mutilation of a spacing and marking signal element to give a warning signal that an error has occurred and that automatic repetition of the mutilated signal is required.

This invention comprises an electrical communication system having at least wo stations, each station being provided with one transmitter and one receiver for each other station, all of which receivers and transmitters are in synchronism with one of said transmitters, whereby two-way information is communicated at all times when the stations are in operation so that special signals may be transmitted and received in each direction at all times to indicate proper reception of the signals by a near receiver from a far transmitter which has selected said near receiver for communication.

The signals which are transmitted are built of a constant number of elements of the constant length time division type such as successive equal interval marking and spacing elements as are used in telegraph code communication. These elements are modulated to indicate a space, a mark or a variation therefrom including the absence or simultation mutilation of a space or a mark either by frequency shift means to high, low and intermediate audio frequencies, or by pulse time modulation means. The audio frequency shifted or time modulated elements may be then further modulated on a high frequency carrier, which high frequency carrier is different for each station, particularly for the stations in a network, in which each station has a separate receiver tuned to the carrier frequency of each of the other stations of the network.

A whole signal includes five elements of traffic code, one or two elements for synchronization purposes and one element for special signals. The traffic code signals usually comprise the standard five unit or Baudot telegraphic code representing letters of the alphabet, numbers and punctuation marks. The synchronization elements may be "start" and "stop" elements at the beginning and end of each whole signal. The special signal element is usually transmitted after the five traffic elements and is used to indicate whether or not the traffic signals received from a far station have been correctly received or not. If they have not been correctly received, that is, if any element in said received traffic signal has been missing or mutilated so as to give an insufficient indication of its characteristic, a warning signal, which is a request for the repetition of the erroneous signal, is sent over this special signal element back to the transmitting station instead of the usual correct or "OK" signal.

The transmitter at each station may comprise a telegraph keyer or other code sending device which converts a five unit mark and space code from holes in a tape into corresponding charges to a series of condensers which store the elements of at least two whole signals in definite signal groupings, so that if a signal must be repeated, it will already be stored without requiring the stepping back of the tape in the keyer, but only stopping the keyer until the repetition is completed. The spaces and marks are converted into different frequencies or phases of time pulses by a special converter generator circuit before being transmitted by high frequency radio or other electrical communication carrier means. The near receiver may synchronize a multivibrator circuit which times the operations of the transmitters, or if it is the master transmitter station, its multivibrator synchronises all the other transmitters and their receivers in the system. The near receiver does, however, control the operation of a repetition device for the transmitter, which operates every time a warning or request-for-repetition signal is received, if the near receiver has received an error and wishes to request a repetition from a far transmitter, such a warning is communicated directly to the transmitter for transmission to the far receiver. Thus, two types of warning signals are dealt with at each station, one requesting a repetition from a far station and the other requesting such a repetition by the near station.

Each receiver at each station, which is tuned to the carrier frequency of the transmitter of a given far station, receives signals from said far station all the time that said far station is in operation. The received carrier wave is demodulated and converted in a bridge circuit into elements of different charges corresponding to marks and spaces. The traffic and special signal elements of a whole signal are then placed on separate condensers for testing and normalizing before being passed on to operate a tape printer or other recording device. The "start" and/or "stop" elements of each whole signal are employed to control a multivibrator which synchronizes the operation of all the parts of the receiver and transmitter units at this near station with the constant length time division elements of the traffic being received. The special element of each whole signal is communicated directly to the near transmitter for transmission back to the station from which the signals are being received to indicate that the reception is correct (OK), or if one of the traffic elements is tested to be insufficient or mutilated, then to operate a repetition device to stop this receiver and to issue a warning signal to the far station that the whole of said mutiliated signal must be repeated.

In the case of a network of stations, instead of just link operation of two-way traffic between two stations only, each station has a distinct frequency for the carrier of the signal elements to which one receiver at each station is tuned and also a special station selector mechanism may be added to each receiver at each station so that only the receiver at the desired station will respond to the traffic from another station. This may be accomplished by transmitting a given traffic signal or letter in code repeatedly for at least three or four times in succession before the actual traffic is transmited, which repeated signal charges a condenser to operate a starting relay in one of the receivers at the far station prearranged to respond only to that repeated calling signal. Thus, a station can be transmitting traffic to another station and special signals to a third station all at the same time while said one station receives over one receiver the special signals from said other station and traffic from said third station.

Special means are provided to account for the mutilation of special signal elements and prevent undue repetition of signals by the printer. Thus when a request for repetition is received by a given transmitter, the signal which is being transmitted at that time is definitely and positively mutilated to insure the stoppage of the receiver at the far station, so that the signals will not be recorded which may be unnecessarily repeated due to the multilation of a correct (OK) signal which has the same effect as a warning signal. If an actual repetition has been requested, the following positively mutilated signal will not be recorded because the printer at the receiver has already been blocked. The printer will remain blocked until the proper following whole signal is received, so that the traffic continues with only a slight delay for the time required to make a repetition cycle which is the time required to send about three whole signals.

Thus, at all times in the system of this invention, signals are being transmitted both ways between any two stations, and if traffic is not being transmitted, then idle time signals are being transmitted, to fill up the traffic elements of the whole signals so that the special signal elements and synchronization elements are always received at each station to keep the system or network ready for immediate operation.

The above mentioned and other features and objects of this invention and the manner to attainment are more fully set forth in the following description of embodiments of the invention taken in conjunction with the accompanying drawings wherein:

Fig. 4 is a chart of the types of signal elements employed in an eight-element whole signal of the system of this invention;

Fig. 5 is a chart similar to Fig. 4 of the special station-call signals which may be used in selecting one of eight stations in a network;

Figure 21:
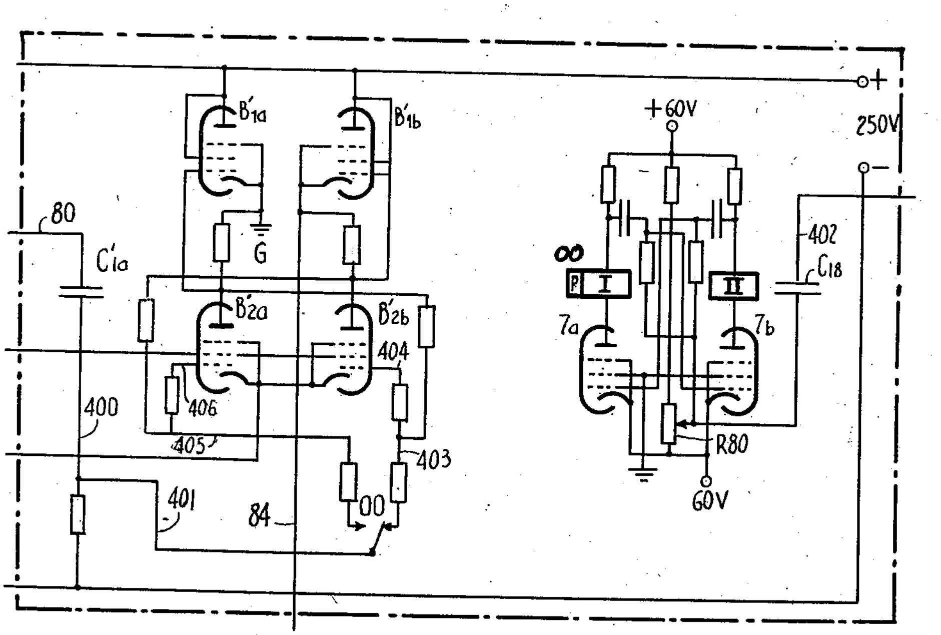
Fig. 21 is a wiring diagram of phase modulation circuit for time pulses in a receiver converter bridge circuit which may be used in lieu of the corresponding converter circuit shown in Fig. 8.
Figure 23:
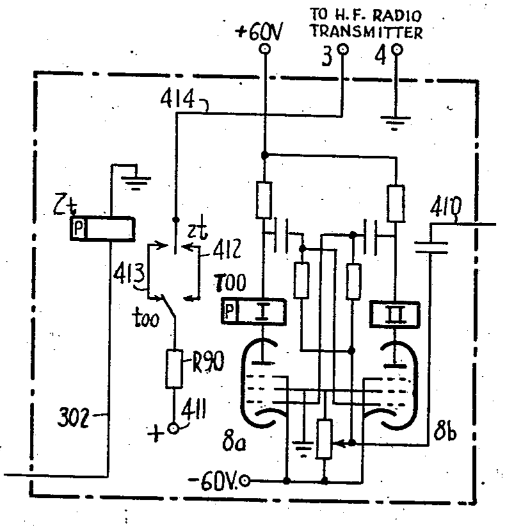
Figure 22:
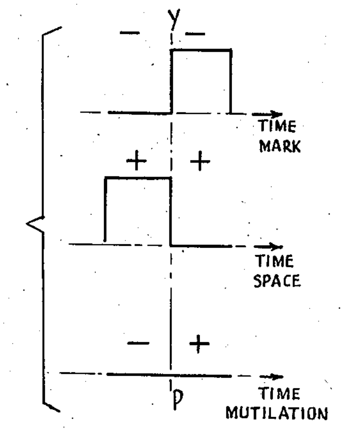
Figure 14:
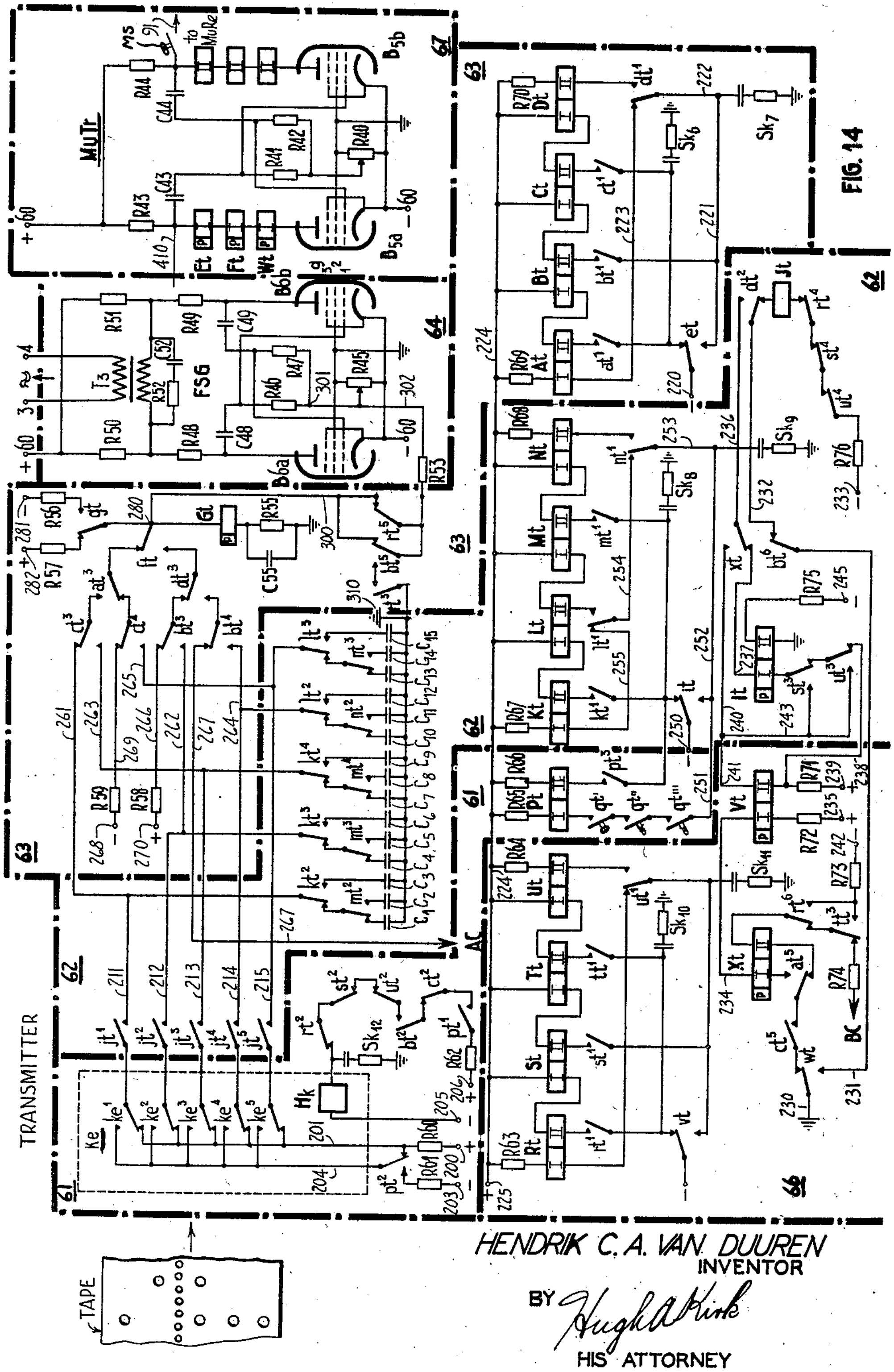
Fig. 14 is a wiring diagram of a frequency shift transmitter circuit of the showing in the block-diagram of Fig. 7.

Fig. 22 is a time diagram of the time or modulated pulses corresponding to the three types of element signals employed in the system of this invention; and Fig. 23 is a wiring diagram of a phase de-modulation circuit for time pulses in a transmitter converter generator circuit which cooperates with the circuit shown in Fig. 21 and which may be used in lieu of the corresponding generator circuit shown in Fig. 14.

I. GENERAL OPERATION

A. *Link operation*

Figure 1:
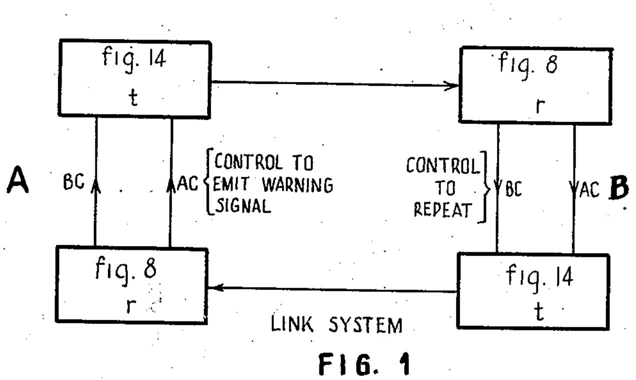
Fig. 1 is a schematic block diagram of link operation of two stations A and B according to the system of this invention.
Figure 2:
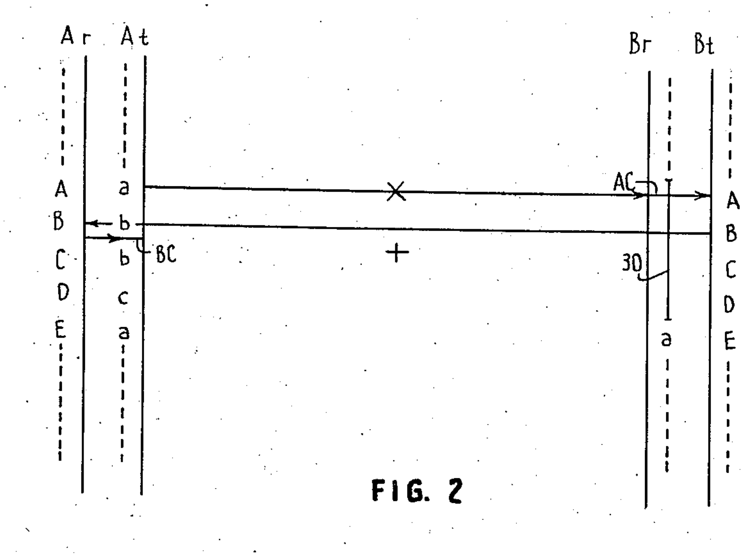
Fig. 2 is a schematic diagram of the request for repetition of a signal between two stations A and B.

In Figs. 1 and 2 there are shown schematically and diagramatically the connections and communications given between two stations A and B in link operation, which are each transmitting traffic to the other and returning special signal elements concerning the condition in which the traffic signals are being received. Each station is thus provided with a transmitter *t* and a receiver *r*, one of which transmitters synchronizes the operation of all the transmitters and receivers in the system. From left to right and right to left the stations A and B transmit signals from its respective transmitter to its respective receiver at the other station. From the receiver *r* at each station there are two kinds of special signal elements communicated to the near or adjoining transmitter at that station, namely (1) signals which indicate that an error or a mutilation has or has not been received at the near receiver and thus communicates over connection AC to control the transmitter to emit a special warning (W) or correct (OK) signal to the far station to repeat or not to repeat the signal, and (2) such special warning (W) or correct (OK) signals which have been received from the far station which are to be communicated over connection BC to the near transmitter to indicate that the last transmitted signal was either correct (OK) and traffic could continue or to control said near transmitter to repeat a signal which was in error or mutilated.

For the transmission of the capital letters "A—B—C—D—E" from transmitter B*t* to receiver A*r* and the transmission of the small letters "a—b—c" from the transmitter A*t* to the receiver B*r*, a traffic diagram is shown in Fig. 2, in which an error (X) occurs (top horizontal line) in the transmission of the letter "a" from A*t* to B*r*. In this event a warning is given to the near transmitter B*t* over connection AC to transmit a warning signal (W) to receiver A*r* which in this system may be indicated by a positive potential corresponding to a space indication for the special signal element. As indicated by the heavy vertical line 30 at station B, the receiver B*r* is immediately blocked to prevent recording of the mutilated letter "a" and any further signals until a correct reception of the letter "a" is received. The reception of the positive warning signal (W) at receiver A*r* (lower horizontal line) is immediately communicated to the transmitter A*t* over connection BC to prevent cancellation of any signals from its storing means and continue transmitting the signals stored thereon until the letter "a" is again transmitted to B*r*. Since the storing means herein illustrated has the capacity for storing three traffic signals or letters and the reception of a warning signal (W) prevents the transmission of the letter following the mutilated letter "a," the following letter "b" is transmitted twice and its following letter "c" is also transmitted to B*r* before the letter "a" is again reached in the repetition cycle for retransmission. Accordingly, the receiver B*r* is blocked (at 30) for four traffic signals during this repetition and sending of the signals already stored at station A until the letter "a" is again ready to be retransmitted and is correctly received. This blocking of the receiver B*r* also prevents further delay in the event an error is transmitted during the time of repetition, as is indicated by the line 30 in Fig. 2. It should be noted, that during the correction of the error in the transmission from station A to B, there was no interruption in the transmission of the traffic from the station B to A and the letters signals "A—B—C—D—E" were timely and properly received during the time of the automatic request for repetition of the traffic for the four traffic signals being communicated in the other direction.

B. *Network operation*

Figure 3:
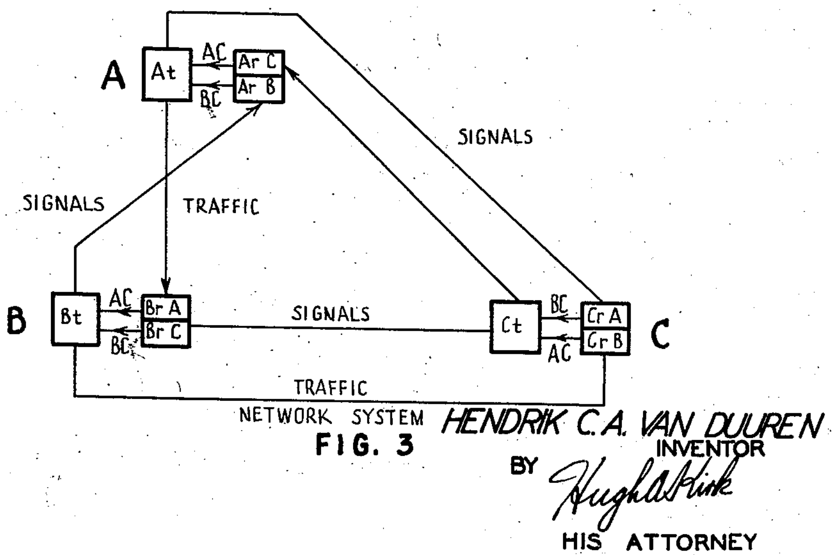
Fig. 3 is a schematic block diagram of network operation of three stations A, B and C according to the system of this invention.

In the case of network operation, which is indicated in its simplest form for only three stations A, B and C in Fig. 3, each one of the stations is transmitting traffic signal elements to another station and special signal elements to a third station from which it is receiving traffic. Thus, there must be as many separate receivers at each station as there are other stations, so as to have one receiver tuned to the carrier frequency of the transmitter of each of the other stations in the network, one of which near receivers communicates the indication of the condition of the reception of traffic to the near transmitter over connection AC for said near transmitter to produce the special signal elements therefrom, and another of which near receivers communicates received special signal elements through connection BC to control the near transmitter. Although the transmitters at each station transmit both the traffic signal elements and the special signal elements in the same signal of eight elements, only the portion of the signal which is relevant to a selected far receiver is detected and acted upon. For example, from station A traffic is going to station B and accordingly station B is not responsive to any of the special signal elements from station A, while on the other hand station C is transmitting traffic to station A and is responsive to the special signal elements from station A to know if the signal transmitted to A was correctly received or not or needs to be repeated. Thus the receiver C*r*A is not connected to record the traffic being sent out from A, and the receiver B*r*A is not connected to communicate any special signal elements being sent out from A to its near transmitter B*t* over a connection BC. Accordingly, only those connections which are desired may be selected of each of the two operating receivers at a given network station, so that traffic can be communicated throughout the network and not just between any two stations thereof as in link operation.

C. *Types of signals*

For the purpose of illustration, the specific embodiment of the invention described in detail hereinafter will be adapted for the communication of an eight instead of a seven element code signal, of which five of the elements are traffic elements for the five units of spaces and marks of the standard telegraphic Baudot code, and the remaining three of the elements will be for "start," "stop" and "special signals," the latter comprising either correct (OK) signal which is a mark (—), or a warning signal (W) which is a space (+). The order of these elements as they occur in each whole eight-element signal are illustrated in Fig. 4; first the "start" signal element which is always a space (+), then the five traffic signal elements of the Baudot code any one of which five elements can be a mark or space, then the special signal element which indicates whether or not the traffic signal received has been received correctly or not, and finally the "stop" signal element which is always a mark (—) and always comes last of the eight elements of the whole signal. The "stop" and "start" elements are also used for synchronization purposes and their operation will be described later. When a station is turned on and no traffic is ready to be sent the station transmits "idle time" signals which comprise a series of all spaces (+) for the five traffic signal element channels. In other words, when a station is turned on, it is always transmitting something and always transmitting something in each of the eight element channels, if not traffic, then "idle time" signals and if any of these are in error or mutilated they are automatically repeated according to the circuits of the system of this invention. When a transmitter has just been turned on and its far receiver has not yet reacted to the transmitter, an idle time signal with a warning signal is transmitted as indicated on the last line of the chart of Fig. 4, so that the far station will be signal synchronized before it is in proper operation and ready for traffic.

In the case of network operation and the automatic selection of the station to which the traffic is to be sent, there may be provided special call signals for each station. Such special call signals for an eight station network are illustrated in Fig. 5. In the particular case shown, the call signals for the different stations are transmitted over the 1st, 3rd and 5th traffic signal channels in which the combinations of marks and spaces have eight different orders, the calling signal also being used as a clearing signal for that station after the message has been completed. Also there is shown a pre-selector control combination of a space and a mark on the 2nd and 4th traffic signal channels, respectively, which are used to prevent de-energization of the pre-selector relay in the receiver circuit during calling of a station as will be described later and which 2nd and 4th space and mark elements therefor must be transmitted with each call signal shown. The manner in which these call signals are distinguished from traffic signals is that these call signals (which also correspond to some letter, number or other traffic signal) are repeated at least three consecutive times before any traffic is transmitted from a station, which repetitions of the same signal charge a condenser in a pre-selected receiver circuit sufficiently to operate the starting relay for the called or selected receiver circuit, while any other combination of repeated signals would not have the same effect on said condenser or circuit because of the way it is connected to the distributor of the receiver. Here in Fig. 5 as in any other whole signal, only a part of the eight elements thereof are shown, and it must be understood that each one of the different signals shown, also must contain either marks or spaces for each of the elements of the whole signal including "start," "stop," and special signal elements as well as any other elements of the group which may not be filled in on the charts in Figs. 4 and 5 for incomplete whole signals.

Although an eight element code or whole signal is described above, a seven element code or whole signal can also be employed without departing from the scope of this invention in that one or the other end element of a whole eight-element signal may be eliminated, in that synchronization may be entirely controlled by one element per signal, say for example the "start" element, thereby making the special signal element VII the last element in each signal. The circuits for enabling this change will be apparent in the following description by the elimination of one set of contacts from the distributor unit circuit of both the transmitter and the receiver.

II. STATION CIRCUITS

Figure 7:
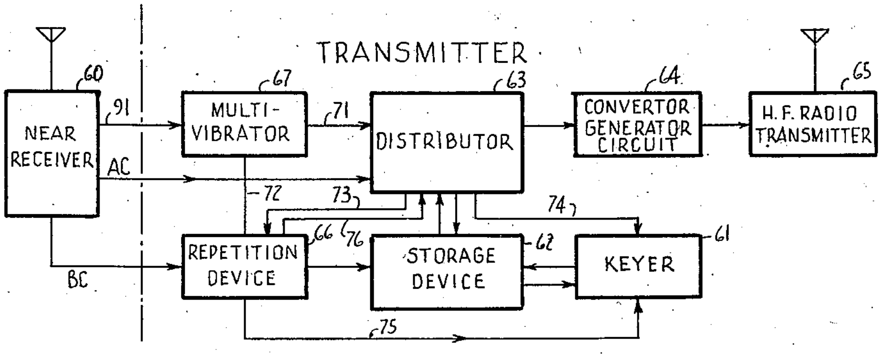
Fig. 7 is a schematic block-diagram of a transmitter circuit at a station.
Figure 8:
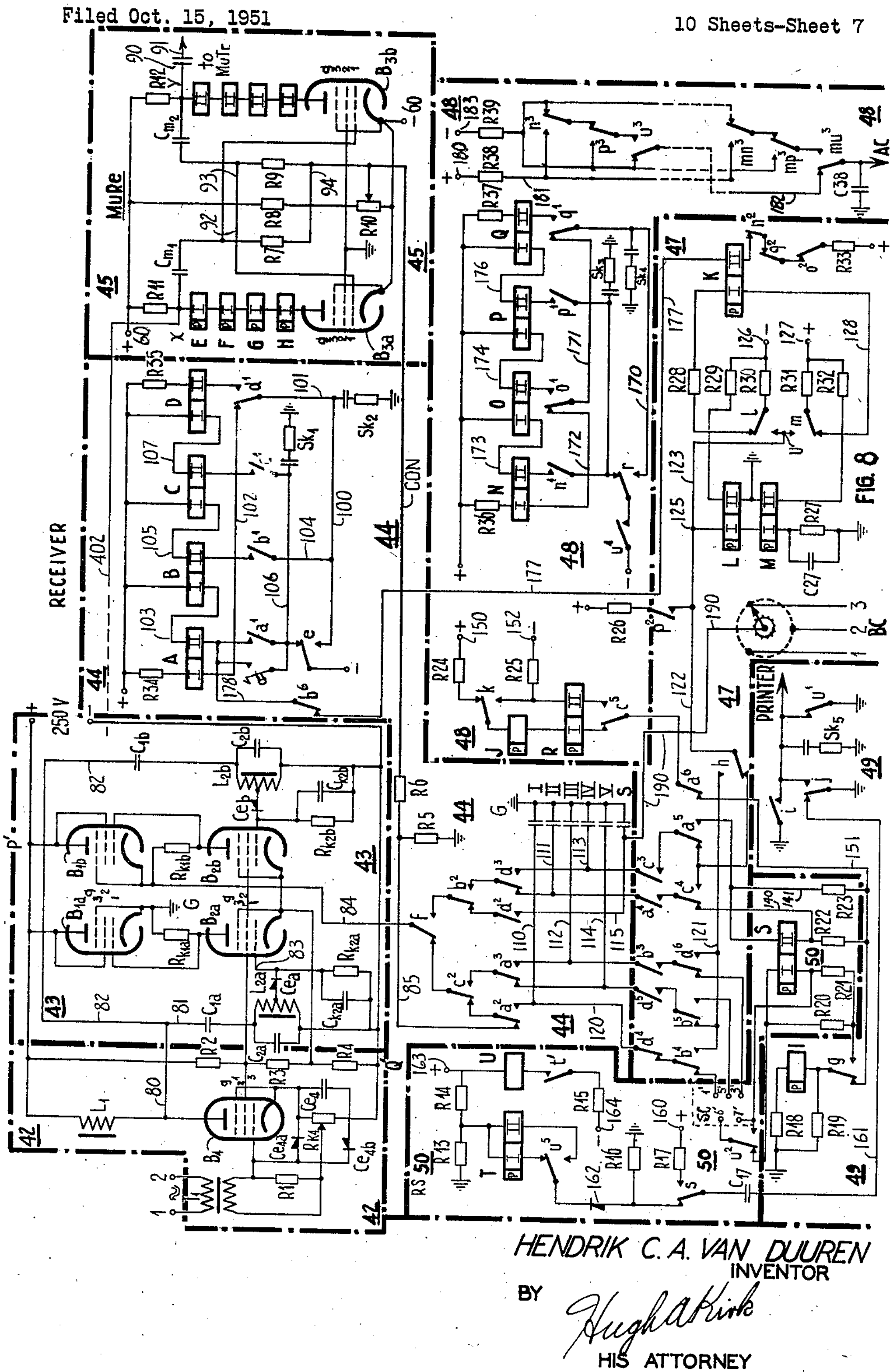
Fig. 8 is a wiring diagram of a frequency shift receiver circuit of the showing in the block-diagram of Fig. 6.

The detailed circuits of the receiver and the transmitter as shown in Figs. 8 and 14 have been divided into different parts or sections by dot and dash lines. These parts and their relationship to each other and to the near or associated transmitter and receiver respectively, are illustrated in the block diagrams of Figs. 6 and 7 in which similar parts or sections from the Figs. 8 and 14 have identical reference characters, and the sections in Figs. 6 and 7 are labeled for better identification and operational purposes.

Figure 6:
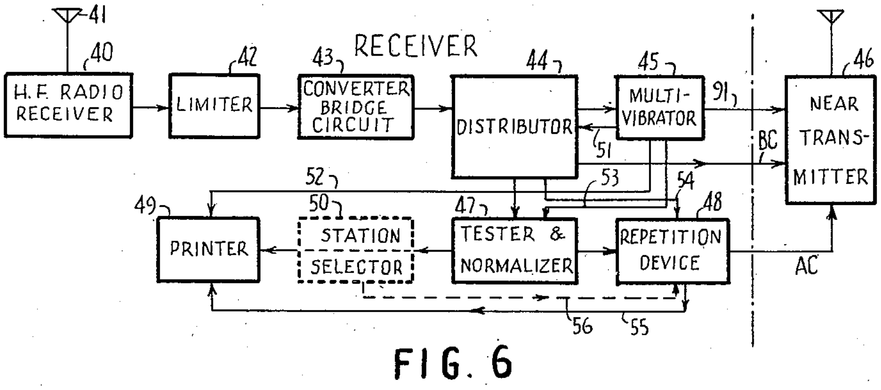
Fig. 6 is a schematic block-diagram of a receiver circuit at a station.

Referring first to the block diagram of Fig. 6 there is shown the sections of the receiver circuit which are common for every station of the system together with lines showing the control connections between said sections and with the near transmitter at that station. For the purpose of illustration, a radio high frequency carrier receiver is shown at 40 having a receiving antenna 41. The detected and demodulated energy from the carrier wave is then passed to a limiter circuit 42 and then to a converter bridge circuit 43 in which the marks, spaces and absences of either a mark or a space are detected and converted into negative (−), positive (+) and zero (0) potentials or voltages, respectively. These successive voltages are then passed to the distributor circuit 44 in which they are distributed in groups of eight successive impulses of equal length in time to correspond to the eight elements of the chosen code signal of the system. The first and last elements of the whole eight-element code signal are then passed to the multivibrator circuit 45 which synchronizes both the remainder of the receiving circuit through connections 51, 52, 53, as well as the near associated transmitter 46 through conductor 91 (provided said transmitter is not the master transmitter for the system). The signals which are distributed in the distributor 44 are then tested and brought up to a common and normal positive or negative (+ or −) voltage of constant and sufficient strength by the circuit 47 to operate the local recorder or printer 49 of the five traffic elements of the signal. The elements of the five traffic signals are tested during the next element of time after they are distributed, so that the indication of the correctness of the whole traffic signal of five elements can be given at one time before any portion of it is transmitted to the printer 49, and so that if even the last element is mutilated or in error an indication can be given to prevent the recording of the whole traffic signal associated with any erroneous or mutilated element. If an error or mutilation has occurred which corresponds to an insufficient or zero voltage for one of the elements distributed, then the repetition device 48 is operated during a given time element through connection 54 by the distributor 44 to control the transmitter 46 over connection AC to send a warning signal (W) to its sending station to have the received mutilated signal repeated. At the same time the repetition device 48 via line 55 stops or blocks the printer 49 from recording the erroneous signal. If the signal received is tested to be correct (OK), such an indication is also sent to the transmitter 46 via line AC and the correct traffic signal elements are permitted to pass to the printer 49 for recordation of the traffic message. In the case of network operation, there may be inserted between the printer 49 and the tester and normalizer circuit 47 a station selector device 50 (shown in dotted lines in that it is not necessary for link operation when there are only two stations), which selector responds to its pre-selected code call for this station and energizes the starting of the printer 49 and via line 56 the connecting of repetition device 48 of that receiver selected for the proper recordation of the traffic signals.

Referring to Fig. 7, there is shown in block the circuit sections of a transmitter and its association with its near receiver 60. The message or traffic signals to be transmitted are herein considered to be a telegraph system of five units or combinations or marking and spacing elements which may correspond to negative and positive voltages, respectively. These impulses are passed from the keyer 61 to a storage device 62 in which three consecutive whole eight-element signals are stored before the first element of the first stored whole signal is transmitted or removed by the distributor circuit 63 and passed to the convertor generator circuit 64 to be converted into proper form for modulation and transmission by a high frequency carrier from the radio transmitter 65. In the event that (1) a warning signal is to be transmitted or (2) that a transmitted signal has been erroneously received and must be repeated, then such indications from the near receiver 60 give the proper information to (1) the distributor 63 through connection AC or to (2) a repetition device 66 through connection BC, respectively; which repetition device 66: (*a*) prevents cancellation of the traffic signals stored in the storage device 62 and has them repeated, (*b*) positively mutilates the signal then being transmitted via line 76, (*c*) stops the keyer 61 via line 75 from passing more signals to the storing device 62 until the repetition is completed. The receiver 60 also may be connected through conductor 91 to synchronize the transmitter circuit through the means of the multivibrator circuit 67 and connections 71 and 72 (if this is not the master transmitter circuit of the system, otherwise conductor 91 is open and the starting of this multivibrator synchronises the apparatus of the whole system). The distributor 63 also controls the timing of, or the time during which signal elements, the repetition device 66, and the keyer 61 may operate through connections 73 and 74.

A. *Receiver circuit*

In the wiring diagrams which follow in this description the circuits are shown in the position they would occupy with the current switched off. All of the relays are shown as horizontal rectangles and those which have more than one winding are marked "I" and "II" for the first and second windings thereof. If the relay is a polarized relay there is a "P" marked at the left in the rectangle representing it. If a polarized relay has two windings, one winding counteracts the pull of the other, while if not polarized, the second winding acts as a holding winding for the action of the first. The armatures of the relays which carry the contacts are shown in the position they last occupied or in their normal biasing position, if biased. The relays are given capital letters as reference characters and their contacts are given the corresponding small letters with following numerals corresponding to the number contact of that relay, i. e., first, second, third, fourth, fifth, sixth. The smaller rectangles lengthwise of the conductors are resistances. All of the vacuum tubes are pentode tubes with three grids numbered *g*1, *g*2, and *g*3 from the cathode to the anode or plate.

The wiring diagram of the receiver circuit shown in Fig. 8 comprises the detail of the blocks to the left of the dot and dash vertical line in Fig. 6, employing a frequency shift converter bridge circuit for the conversion of two different audio frequency signals corresponding to marks and spaces into corresponding negative and positive voltages of equal time duration. The audio signals may range between about 1075 and 1925 cycles per second with a middle frequency of about 1500 cycles per second which is herein identified as a simultaneous mutilation of a mark and space frequency. To distinguish clearly between marks and spaces, their corresponding frequencies should be at least about 30 cycles above and below the middle frequency, and preferably about 200 cycles above and below 1500 cycles, i. e. a space or positive voltage would correspond to a 1700 cycle frequency signal, and a mark or a negative voltage would correspond to a 1300 cycle frequency signal, and then anything which did not approach either of these two high and low space and mark frequency levels would be a mutilated signal and produce a zero voltage in the converter. Thus, the frequency shift generator of this receiver circuit responds to space frequencies, mark frequencies, and to the absence of either said frequencies.

1. LIMITER AND BRIDGE CONVERTER

Figures 9, 10:
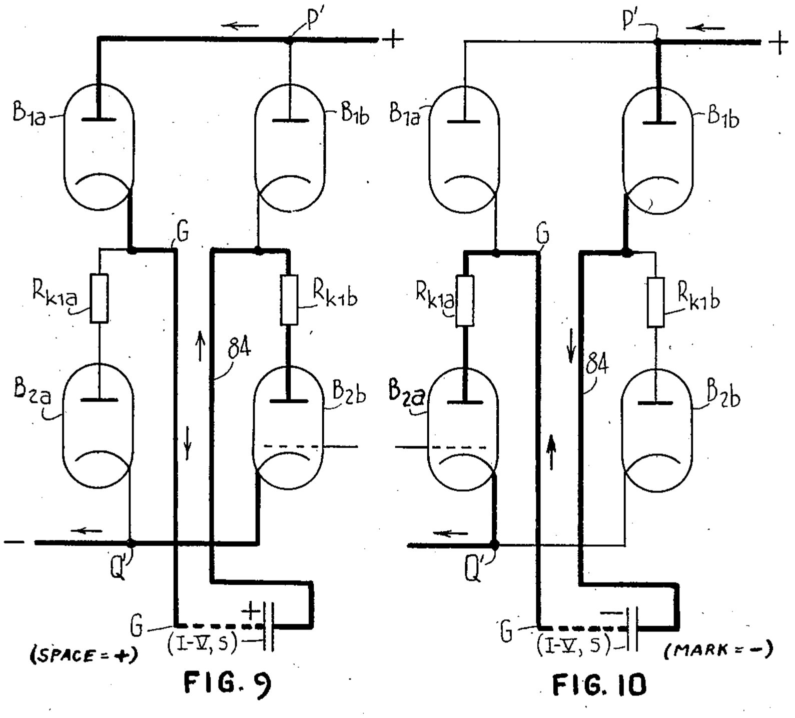
Figs. 9 and 10 are wiring diagrams of two different operations of the bridge part of the converter bridge circuit shown in Fig. 8 for producing spacing and marking signals, respectively.

The incoming audio frequency signals from the high frequency receiver 40 (Fig. 6) are connected across terminals 1 and 2 in Fig. 8, of the transformer T1 to the limiter circuit 42 comprising the vacuum tube B4. This tube adjusts the amplitude of the signal to that of a constant value before it introduced into the converter bridge circuit 43 from the anode of B4 over conductor 80, which is connected in parallel through conductors 81 and 82 and condensers C1*a* and C1*b*, respectively, to separate resonant circuits, one tuned to the marking frequency and the other tuned to the spacing frequency. The marking frequency resonant circuit comprises condenser C2*a* and inductance L2*a* in parallel, which inductance is center tapped through a rectifier or one way resistance C*ea* through conductor 83 to the control grid *g*1 of vacuum tube B2*a*, one of the four vacuum tubes which are in each leg of the converter bridge circuit of this invention. The other and spacing frequency resonant circuit is similar in structure and comprises a condenser C2*b* and inductance L2*b* in parallel, which inductance is also center tapped through a rectifier C*eb* and connected to the control grid *g*1 of another vacuum tube B2*b* of the four tube converter bridge circuit. The proper resonant frequency in one or the other of the resonant circuits will open its corresponding vacuum tube and one other vacuum tube diagonally opposite it in another leg of the four tube bridge circuit to charge a condenser in the distributing circuit 44 to a positive or a negative voltage depending upon whether a spacing or marking frequency is received. The vacuum tubes B1*a*, B1*b*, B2*a* and B2*b* control the flow in the four legs of a receiver bridge which is fed between the points P′ and O′ (see also Figs. 9 and 10). Two of these legs will be simultaneously open while the other two legs will be then simultaneously biased to cut-off. Thus while a marking frequency develops a high voltage across the inductance L2*a*, the tube B2*a* (see Fig. 10) will be come conductive and the consequent current in the cathode resistance R*k*1*a* of tube B1*a* will render the control grid *g*1 of tube B1*a* negative with respect to its cathode and the current through R*k*1*a* cannot therefore pass through tube B1*a* but has to pass through to ground G, and then through one of the condensers I, II, III, IV, V or S of the distributor circuit 44, depending upon which of the contacts *a*2, *a*3, *d*2, *d*3, *c*2, *b*2 and *f* of the distributor tree of contacts just below the bridge circuit 43 may be closed at that instant, then back to the converter circuit 43 through conductor 84, the cathode of tube B1*b* and plate of this tube B1*b* to the point P′ and the anode voltage source, thus charging one of the distributor condensers to a negative potential corresponding to a marking signal. Since tube B2*b* is cut-off at this moment, there will be no voltage drop across the resistance R*k*1*b*. If on the other hand a spacing frequency is received and a voltage is applied to the control grid *g*1 of tube B2*b* (see Fig. 9) then the circuit will be through the resistor R*k*1*b*, conductor 84, contacts of the distributor tree which are closed at that instant to one of the condensers I, II, III, IV, V or S, and through ground G to the cathode of the tube B1*a* and then the plate of this tube to the anode voltage supply, thus charging the condenser in the distributor to a positive potential corresponding to a spacing signal.

In the event the frequency received is not sufficiently like either one of the tuned frequencies for the resonant circuits of the converter bridge circuit, then neither pair of legs of the bridge circuit will be conductive and a zero or no potential will be connected to one of the condensers of the distributor circuit, and accordingly when this condenser is tested, the condition of a mutilation of the signal will be found and responded to.

2. RECEIVER MULTIVIBRATOR

When the last element of each eight element signal is being received, the contacts *f*, *c*2 and *a*2 are closed as shown in the distributor circuit 44 in Fig. 8, and the converter bridge circuit 43 is not connected to any one of the distributor condensers I through V and S. This is because during this time interval of operation of the element VIII of each whole signal no one of the counting chain relays A, B, C and D of the distributor circuit is energized, see the full lines in the time diagram of Fig. 12. Accordingly, during this time of the "stop" element VIII, the distributor (see Fig. 8) is connected with the receiver multivibrator circuit 45 or M*u*R*e* from conductor 84, through back contacts of *f*, *c*2 and *a*2 of the above mentioned tree of contacts of the distributor, then through conductor 85, the function of resistances R5 and R6, and conductor CON to said multivibrator to synchronize the vibrations of the multivibrator to control the operation of the whole receiver and maybe also its associated or near transmitter through the condenser 90 and conductor 91.

The time constant circuits of the multivibrator M*u*R*e* comprising the condensers C*m*1 and C*m*2 and their associated resistances R7, R9, R10, R11 and R12 are predetermined in value to produce alternate pulses at the rate of 50 bauds or at a frequency of 25 cycles per second, that is, each pulse corresponds to the duration of time for one element of the eight-element signal of this system which has a duration of 20 milliseconds (ms.), the whole signal of eight elements requiring 8×20 ms.= 0.16 second for its transmission or reception.

As soon as the receiver is turned on, the multivibrator oscillates from about +60 volts to about —60 volts each 20 ms., alternately at the points *x* and *y*, firing one tube B3*a* while the other is biased to cut-off and then firing the other tube B3*b* while the first is biased to cut-off. This oscillation is caused by the building up of charges alternately on condensers C*m*1 and C*m*2 which at first increase the conductivity of the fired tube by making the grid of that tube more positive until a maximum is reached and then the charge leaks off through the grid leak resistances R7 or R9 and part of R10 until the potentials of the grids approach normal, and then the tube which was cut-off becomes conductive and cuts off the previously conductive tube. And so the alternate firing of the tubes continues at the 20 ms. rate determined by the time constant of the condensers and resistances of the multivibrator circuit M*u*R*e*.

Figures 12, 13, 15, 16, 17, 18:
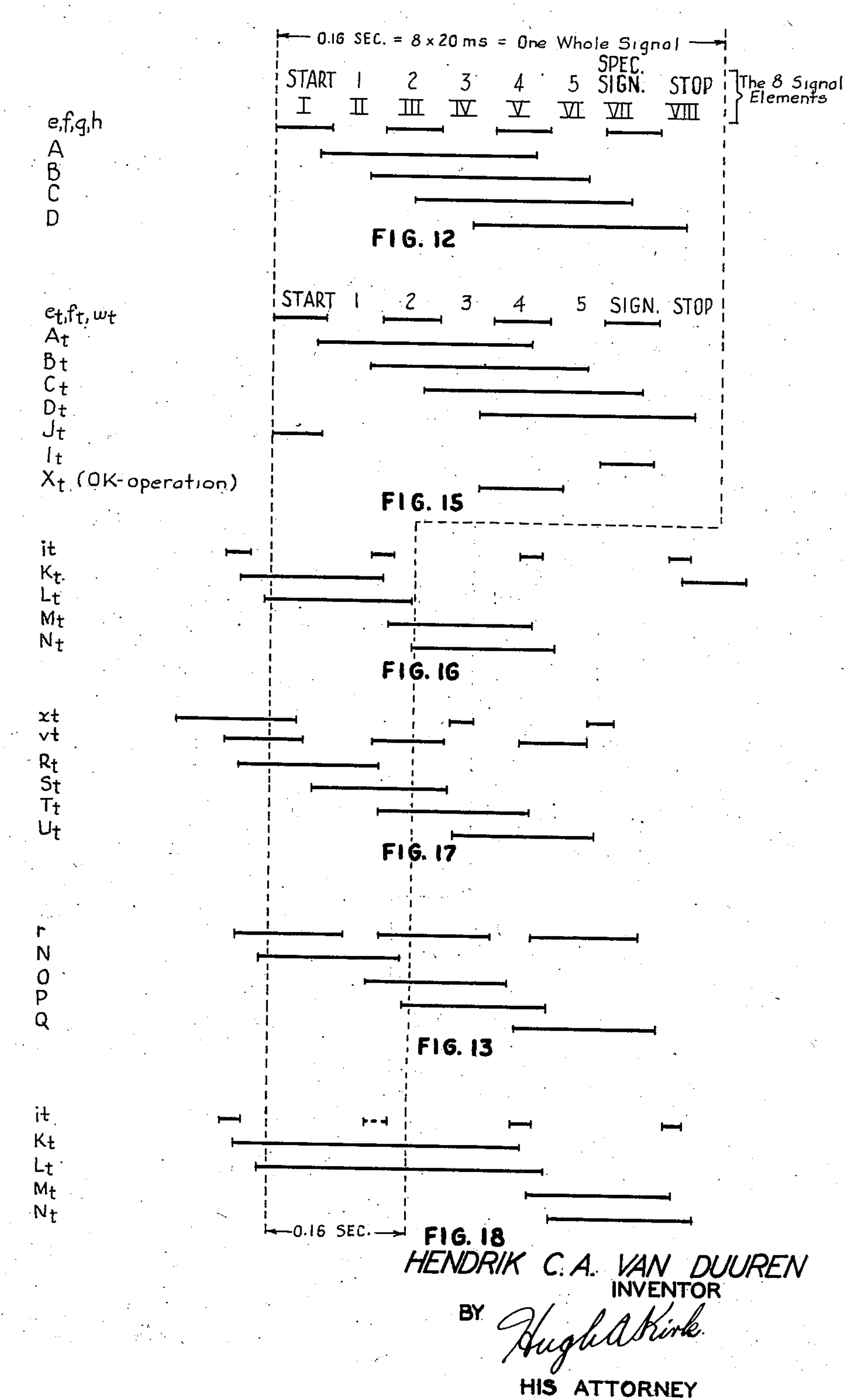
Fig. 12 is a time diagram of the operation of the receiver multivibrator and distributor counting chain relays.
Fig. 13 is a time diagram of the operation of the receiver repetition device counting chain relays.
Fig. 15 is a time diagram of the operation of the transmitter, multivibrator and distributor counting chain relays.
Fig. 16 is a time diagram of the operation of the transmitter storing device counting chain relays.
Fig. 17 is a time diagram of the operation of the transmitter repetition device counting chain relays.
Fig. 18 is a time diagram of the operation of the transmitter storing device counting chain relays when a repetition is being transmitted.

In the plate or anode circuits of each of the tubes B3*a* and B3*b* are placed the opposing windings I and II of the timing relays E, F, G and H of the receiver circuit in Fig. 8, so that when tube B3*a* fires the windings I of these polarized relays are energized to operate their contact carrying armatures *e, f, g* and *h* to the opposite positions from those shown in Fig. 8; and to remain in that position until the windings II of said relays are energized by the firing of tube B3*b* which returns said armatures *e, f, g* and *h* to the positions shown. Thus each of these armatures alternate once each 20 ms. or for every element I, II, III, IV, V, VI, VII and VIII as shown in Fig. 12. The armature *e* of relay E controls the timing of the counting chain relays A, B, C and D of the distributor circuit 44; the armature *f* of relay F is at the top of the tree of contacts of the distributor circuit 44; the armature *g* of relay G controls the timing of the pre-selector 50 and printer 49; and the armature *h* of relay H controls the timing of the testing and normalizing circuit 47 and is at the end of contact tree of this circuit.

The leakage of the charge from the condensers C*m*1 and Cm2 of the multivibrator may be increased or decreased by the application of voltages through conductor CON which are out of phase with the voltages normally flowing in the circuits from these condensers. Thus, if the first or "start" element I of positive voltage is received while the multivibrator M*u*R*e* still has the tube B3*b* energized and as a result the armature *f* is in the position shown in Fig. 8, then this positive voltage is conducted over CON to augment the discharge of condenser C*m*2 and advance the firing of tube B3*a* so that relay F will be energized sooner and back contact *f* will be opened.

The amount which this voltage in CON can advance or retard the normal oscillations of the multivibrator circuit is about 2 ms. for any one cycle, and since the multivibrator can never be more than one whole signal of eight elements out of phase with the signal received, it may take as much as about 13 seconds before complete synchronism of the whole signal is obtained, but once this is established, element synchronism is also established, and thereafter it will rarely occur that the system will be more than a few milliseconds out of synchronism during its operation. In fact, if the received signal is within less than 1 ms. of synchronism, no correction will be made by the synchronizing signals, in that it takes this long for the relays of the circuit to operate.

Figure 11:
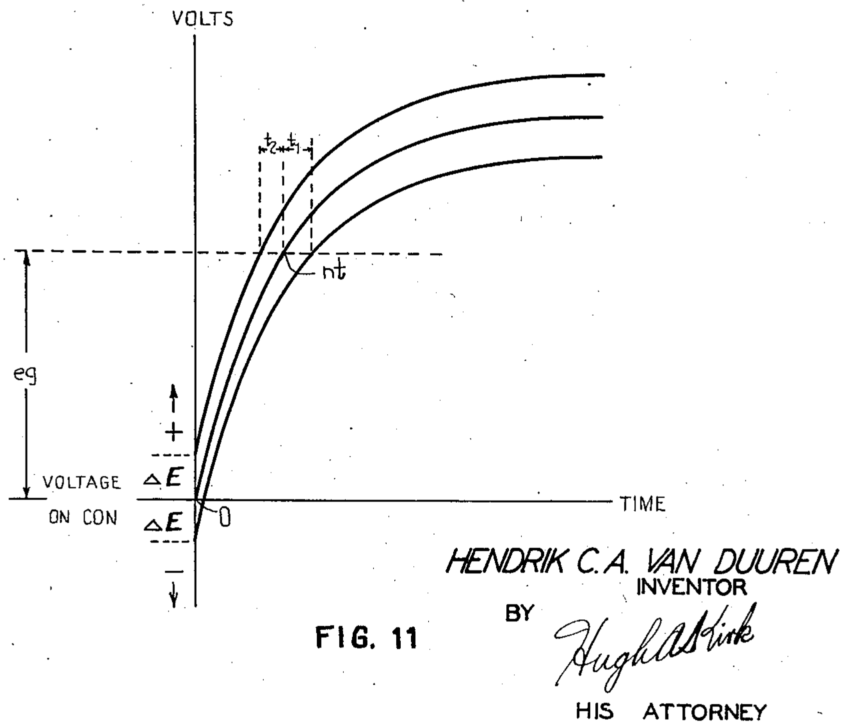
Fig. 11 is a graph of the operation of the multivibrator circuit shown in Fig. 8 and how synchronization is maintained.

On the other hand, a negative voltage on CON during the time when tube B3*b* is conducting, will have no effect on cutting off this tube and firing the other tube B3*a* until the negative voltage has remained on CON for more than about one millisecond after the time that the tube B3*b* should be cut off according to the 20 ms. oscillation of the M*u*R*e* circuit, then its cutting off will be delayed about 2 ms. to bring the M*u*R*e* that much closer into proper synchronism with the negative pulse of the received signal. This advancing and delaying of the multivibrator elements to get into synchronism with the received signals is better illustrated by reference to the graph of Fig. 11 in which the normal voltage necessary for firing either one of the tubes B3*a* or B3*b* is represented by the dotted horizontal line at level *eg*. According to this graph, if the voltage on the condenser CON is zero, then the middle curve is followed and the tube fires at the normal time *nt*. However, if the voltage on CON is negative and the tube B3*a* is cut off as it must be cut off when CON is connected to M*u*R*e*, then positive potential leaking from the condenser C*m*2 directly connected to the anode of the conductive tube B3*b* will be counteracted somewhat and the time that the voltage on the grid of B3*a* takes to reach the value *eg* will be delayed so that the time of that element will be lengthened by the time increment *t*1. Similarly, if a positive voltage is applied over CON at this time when B3*a* is cut-off, then the positive potential leaking from the condenser C*m*2 will be augmented and the time the voltage on the grid of B3*a* takes to reach the value *eg* will be advanced so that the time of that element will be shortened by the time increment *t*2.

As long as the elements of each signal are in proper synchronization, it follows that the signals made up of eight consecutive elements will also remain in synchronization, once they are so synchronized. This signal synchronization is obtained during starting by the transmission of an eight unit signal in which all of the elements are positive or spaces except one which is negative and a mark and this occurs during the VIIIth or "stop" element, see Fig. 4. Thus as long as a positive potential is applied over CON when the tube B3*a* is cut-off, the element will be lengthened and such will continue until exact synchronism with the only negative element in the eight-element signal is in synchronism. This may take, as stated above not longer than about 13 seconds time, but once this synchronism is established, it will remain so for as long as the receiver remains on.

3. RECEIVER DISTRIBUTOR

Following in sequence the operation of the contacts of relays E and F in the distributor circuit 44, the first change over of these two contacts from the position shown in Fig. 8 energizes the first counting relay A from negative potential through forward contact of armature *e*, conductors 100 and 101, back contact *d*1, conductor 102, winding I of relay A, resistance R34 to positive potential. This energization of relay A, closes its holding contact *a*1 so that as soon as relay E is de-energized at the end of this element, relay A will be held energized from negative potential through *e, a*1 and winding II of A and then winding I of relay B will be energized through conductor 103, to positive potential. Relay A also changes over two armatures *a*2 and *a*3 in the upper part of the contact tree of the distributor circuit 44 which aid in connecting conductor 84 from the converter bridge circuit 43 to one of the condensers I, III and V; and also two armatures *a*4 and *a*5 in the right side contact tree of the testing and normalizing circuit 47 which connect condensers II and IV with the testing relays L and M; and finally armature *a*6 shown in circuit 47 near contact *a*5 which determines the time when the repetition device 48 may operate. So far no one of the condensers is connected to the converter circuit because the armature *f* is against its forward contact from which no armatures of the relay A is connected. In the event that the multivibrator 45 is late in operating the armature *f* before the first positive signal element "start" is received over conductor 84, then this positive potential will be applied through contacts *f, c*2 and *a*2, conductors 85 and CON to the multivibrator circuit M*u*R*e* to advance the time when the element should be cut-off to operate relay F, thus better synchronizing M*u*R*e* circuit with the incoming "start" element of the signal, thus describing the useful purpose of this "start" element I of each whole signal.

The next movement of the armatures of the relays E and F is again to the position in which they are shown in Fig. 8, but since relay A has already been energized, the second signal element II or traffic signal "1" is now immediately conducted from the converter 43 through 84, back contacts *f* and *c*2 and front contact *a*2 and conductor 100 to place a charge on condenser I. At this same time winding I of relay B is also energized in series with the holding winding II of relay A, so that the armature *b*1 is operated to prepare for holding relay B energized through its winding II when armature *e* is again operated during the following element of 20 ms. Relay B also operates armature *b*2 in the contact tree in the distributor to the condensers II, IV and S, and armatures *b*3, *b*4 and *b*5 in the left part of the contact tree from the condensers of the testing and normalizing circuit 47; and armature *b*6 (below relay A in the distributor circuit) which controls the fault finding relay K (at lower right of Fig. 8) in the testing circuit 47.

During the time interval of operation of the element III or traffic signal element "2", armatures *e* and *f* are again operated to their front contacts, and traffic signal element "2" is transferred from converter 43 through conductor 84, forward contacts *f* and *b*2, back contacts *d*3 through conductor 111 to condenser II. Also both relays A and B are held energized through circuits *e*, 100, 101, *d*1, 102, winding I for relay A; and through *e*, 100, 104, *b*1, winding II for relay B, respectively, which holding of relay B also energized relay C through conductor 105 and its winding I. Relay C now operates its armatures *c*1 in its holding circuit to its winding II, armatures *c*2 in the contact tree of the distributor to condensers I, III and V; armatures *c*3 and *c*4 in the right hand contact tree of the testing and normalizing circuit 47, and armature *c*5 (in the repetition device below relay R). This prepares the circuits for the element IV.

During the time interval of operation of the element IV of traffic signal element "3," armatures *e* and *f* are again at their back contacts as shown in Fig. 8 and the traffic signal "3" is now conducted from the converter 43 through circuit 84, back contacts *f*, front contacts *c*2 and *a*3, conductor 112 to condenser III. Also, all three relays A, B and C are held energized through the following circuits: contacts *e*, *a*1, winding II for relay A and winding I for relay B in series therewith; and through contacts *e*, conductor 106, *c*1, and winding II for relay C and also winding I for relay D in series therewith. This energizes relay D for the first time, which relay operates its armature *d*1 to its holding winding II, armatures *d*2 and *d*3 in the distributor contact tree to condensers II, IV and S; and armatures *d*4, *d*5 and *d*6 in the left hand contact tree of the testing and normalizing circuit 47 to prepare them for following elements.

During this time interval of operation of the element V or traffic signal element "4," armatures *e* and *f* are again operated to their forward contacts, and traffic signal "4" is conducted from the converter 43 through circuit 84, forward contacts of *f*, *b*2 and *d*3, conductor 113 to condenser IV. Also relays B, C and D are energized, relay A dropping out during operation of this element "4" in that armature *d*1 has opened the circuit to it from armature *e*. The circuits for these energized relays are: through armature *e*, conductors 100 and 104, contact *b*1, winding II for relay B, 105 and winding I of relay C to positive potential; and through armature *e*, 100, forward contact of *d*1 winding II of relay D, resistance R35 to positive potential.

During the time interval of operation of the element VI or traffic signal element "5," armatures *e* and *f* are again as shown in Fig. 8, and traffic signal "5" is conducted from the converter 43 through circuit 84, back contact *f*, front contact of *c*2, back contact of *a*3, conductor 114 to condenser V. During this time interval of operation of the element VI, relay B also drops out and only relays C and D remain energized through circuits; *e*, 106, *c*1 winding II for relay C, conductor 107, and winding I for relay D.

During the time interval of operation of the element VII or the special signal element, armatures *e* and *f* are again operated, and the special signal potential is conducted from the converter 43 via circuit 84, front contact *f*, back conact *b*2, front contact *d*2, conductor 115, to condenser S. Relay C is now dropped out because relay B has been de-energized and *e* is not connected with conductor 106 and contact *c*1, therefore only relay D remains energized throughout the operation interval of this element through circuit from front contact of armature *e*, conductors 100 and 101, front contact of *d*1 through winding II of D.

During the time interval of operation of the last element VIII or "stop" element of the whole eight-element signal, the converter 43 is connected to the multivibrator M*u*R*e* through the circuits mentioned previously, viz. 84, back contacts of *f*, *c*2 and *a*2, conductor 85, resistance R6 and CON; and relay D falls out because armature *e* is now against its back contact breaking the circuit through armature *d*1. During the operation of this last element VIII, the synchronism of the circuit is again verified through conductor CON and changed slightly, if need be, and then the whole cycle starts over again. The operation interval of the relays A, B, C and D as described above can be diagrammatically followed in the time chart of Fig. 12 in relationship to the proper operation of the relays E, F, G and H of the multivibrator circuit M*u*R*e* or 45.

4. TESTER AND NORMALIZER

As soon as a signal element has placed its positive or negative charge on a condenser in the distributor circuit 44, the charge on that condenser is tested and normalized during the following time element of the signal by the circuit 47. Referring to Figs. 8 and 12, during the operation interval of the element III, while traffic signal element "2" is being placed in condenser II, a circuit is connected from condenser I, through conductors 110 and 120, back contact *d*4, front contact *b*4, conductor 121, front contact of armature *h*, conductor 122 to junction 125, and through windings I of the two polarized relays L and M in series, which are wound so that L operates its armature *l* (away from the position shown at relay L) if the charge on condenser is negative and corresponds to mark signal, relay M maintaining its contact *m* as shown to the right of relay M, and relay M operates its armature *m* (while armature *l* remains as shown) if the charge on the condenser is positive and corresponds to a space signal. Thus either L or M is operated all the time during normal operation of the receiver circuit and both their armatures only take the position shown when the charge on one of the condensers I through V being tested is zero or insufficient to operate the relay L or M, which insufficiency indicates that the signal element is in error or has been mutilated and a repetition thereof is necessary.

For normal unmutilated operation, if condenser I has a negative charge, relay L is energized to throw its armature *l* against its front contact and connect a given standard negative potential from terminal 126, through resistance R30, front contact *l*, conductors 123 and 122 etc. back to the condenser I to insure that its charge is of a given and constant corresponding negative value, so as later to definitely operate the printer 49. Similarly, if the charge on condenser I is positive, relay M will operate and relay L and its armature *l* will remain in the position shown, so that positive potential from terminal 127 will be conducted through resistance R31, front contact of *m*, conductors 123, 122, etc. to condenser I to insure its positive charge will be of a given and constant value for later proper operation in the printer 49.

In the event no charge or an insufficient charge is placed on a condenser being tested to overcome the normal bias of relays L and M from negative terminal 126, resistance R29, winding II of L to ground; or from positive terminal 127, resistance R32, winding II of M to ground; then the armatures *l* and *m* of these relays take the position shown in Fig. 8, closing a circuit from negative terminal 126, through R30, back contact 1, R28, winding I of polarized fault finding relay K, conductor 128, back contact *m*, R31 to positive terminal 127. This circuit energizes the fault finding relay K which remains operated until reversed by a current through its winding II, and while operated moves its armature *k* (see center of Fig. 8) in the repetition device 48 to its front contact. This operation will be described later.

Similarly, each of the other condensers II, III, IV and V is successively tested and normalized by being successively connected through the tree of contacts operated by relays A, B, C and D in the testing and normalizing circuit 47, to the relays L and M. The sequence may be followed by reference to the time chart of Fig. 12 together with the contacts of these relays A, B, C and D shown in circuit 47 together with the operation of armature *h*.

When all five of the condensers I through V have been tested to be adequate, the received traffic code signal is considered to be correct (OK) and then may be transmitted to the selector 50 or printer 49.

5. PRINTER

In the case of link operation, a selector circuit 50 is not necessary and tested and normalized charges on the condensers I–V are directly and successively used to operate the polarized printer relay I in the circuit 49 shown at the lower left corner of Fig. 8. The relay I is controlled through an armature *g* which oscillates each 20 ms. as and together with the other armatures *f* and *h* connected to the contact trees of the distributor and testing circuits. When the selector 50 is shunted out, the three right hand terminals 1', 3' and 5' of the selector box SC are connected directly to the front contact of armature *g*, and conductors 140 and 141 from the right hand half of the contact tree of the testing circuit 47 are connected directly to the back contact of armature *g*. This is the way they are actually connected through the contacts and relays of the selector circuit 50, which contacts and relays are not now necessary when only two stations are involved and each station has only one receiver and one transmitter. Now, the tested normalized charge on condenser I of the distributor circuit 44, which holds the charge corresponding to the signal of the first element signal "1" of traffic, is connected to operate relay I or maintain it in its operated position. This circuit is completed after all of the elements of the eight element signal have been received and during the time interval of the first element of the following eight-element signal and before the first of the traffic signal element "1" of the following whole eight-element signal are converted. The connection of this first element of the previous traffic signal to the printer relay I, may be traced from the condenser I, conductors 110 and 120, back contacts of armatures *d*4 and *b*4 (since at this time of the first element I of the eight-element signal neither relay B or D is energized, see Fig. 12), front contact of *g*, relay I and resistance R18 to ground. If the charge on the condenser I is positive or a space, relay I will be operated to close its armature *i* connecting the printer to ground (assuming contact *u*1 open or omitted in link operated systems). However, if the charge on the condenser I is negative, relay I will not operate and its armature will remain open for the period of one element of 20 ms.

The printer is always energized so it can respond immediately to every printer starting impulse sent to it; one for every whole eight-element signal to be recorded. Upon reception by the printer of one of its starting impulses the printer will operate for one cycle of duration of about 140 ms. and then it will stop automatically and await for the next of its starting impulse to repeat its operation. During the 140 ms. of any such cycle, there is time for each of the five 20 ms. traffic signal elements of a whole signal to be recorded. This starting signal for the printer is transmitted during the operation interval of the element VIII of the eight-element signal from the positive terminal 150 (shown at the center of Fig. 8 in the repetition device circuit 48) through resistance R24, armature *k*, polarized relay J and R (which positive potential only presses their armatures more towards their back contacts in the position shown), back contacts of armatures *c*5 and *a*6 (because neither relays A or C are operated during element VIII), conductor 151, back contact of armature *g*, relay I and resistance R18 to ground. This positive current from terminal 150 operates relay I to close the contact *i* to the printer and give it a starting impulse (which is a positive or space signal element) so that it will start its 140 ms. cycle during which it will respond to marks and spaces of the next five following operations of relay I according to the charges on condensers I through V.

Tracing the connections of each of the remaining four condensers II through V to the relay I, there is: for condenser II during the interval of element II circuit therefrom through conductor 111, contact *a*4, back contact of *c*4, resistance R22, back contact of *g*, to relay I; for condenser III during the interval of element III circuit therefrom through conductor 112, contact *b*3, back contact of *d*6, conductors to front contact of *g*, to relay I; for condenesr IV during the interval of element IV circuit therefrom through conductor 113, contact *c*3, front contact of *a*5, conductor 141, resistance R23, back contact of *g* to relay I; and for condenser V during the interval of element V circuit therefrom through conductor 114, contact *d*5, front contact of *b*5, conductors to front contact of *g*, to relay I. Thus, the charge of one traffic signal is transferred to the printer during the time interval of the element just before the corresponding signal element of the following signal is distributed to the condensers I through V. This delay in recordation of the traffic signals provides sufficient time for automatic verification of these signals, and if one is in error, prevents the whole traffic signal of five elements from being recorded until a proper signal has been received after its repetition has been automatically requested. Thus the printer only prints correct signals and no mutilations will or can be printed by the printer 49.

6. SELECTOR

In the case of network operation, a selector 50 is employed as shown in circuit Fig. 8, comprising the relays S, T and U, and condenser C17. This selector is operated by the first few identical eight-element signals which are sent before the message or traffic signals are sent, to select the desired and called station receiver from the similarly tuned receivers at the other stations in the network, which receiver has had its selector circuit pre-set to correspond to that station's call signal. This pre-setting is done by the connections made in box SC of the selector circuit 50 shown in Fig. 8 i. e. which ones of the terminals 1', 3' and 5' are connected to terminal 6' to operate relay S and which ones are connected to terminal 7' to by-pass relay S. For example, terminals 1' and 5' could be connected to terminal 6' to operate winding I of polarized relay S, and terminal 3' could be connected to terminal 7' to by-pass relay S, which could correspond to the call for station No. 2 as illustrated in Fig. 5 so that only the positive charges on condensers I and V, and a negative charge on condenser III would maintain relay S operated for the full time of the eight-element signal, since condensers I, III and V are respectively connected through the contact tree of the testing circuit 47 to terminals 1', 3' and 5'.

Positive potential from terminal 6′ through back contact of armature $u2$ to winding I of relay S, resistance R21, front contact of $g$, relay I, resistance R18 to ground, would operate both relays S and I, but the latter relay I would not effect the printer 49 at this time because relay U has not as yet been operated because the selection has not yet been made, and therefore armature $u1$ of relay U in the printer circuit would maintain the printer blocked and connected to ground so that any closure of contact $i$ would not effect the printer or start it to operate. As previously stated and as illustrated in Fig. 5, traffic elements "2" and "4" of each call signal are alternately positive and negative, which place corresponding charges on condenser II and IV in the distributor circuit 44, and which condensers are connected through right hand contact tree of the testing circuit 47 to opposite sides of the winding II of relay S, so that the positive charge from condenser II will by-pass this winding II of relay S and the negative charge will pass through it, maintaining relay S operated as initiated by the positive charges which have already passed through winding I of relay S.

By repeating the calling signal several times, at least three times, the armature $s$ at the left of Fig. 8 in the selector circuit 50 will be held against its front contact for a sufficient length of time so that the condenser C17 will build up a substantial positive charge from terminal 160, through circuit of resistance R17, armature $s$, conductor 161, back contact of $j$ to ground. Then when an idle time or other type traffic signal is received, after the repeated call signals and before the traffic signals of the message to be recorded, relay S will be de-energized, because of a signal combination other than the one for which the terminals of SC are connected, thereby returning armature $s$ to its back contact causing the condenser C17 to discharge through rectifier 162, back contact of armature $u5$, winding I of polarized relay T, resistance R13 to ground, operating relay T and its armature $t$ (to its right) closing the circuit from positive terminal 163, through relay U, contact $t'$, resistance R15 to negative terminal 164. This circuit energizes relay U to operate all its armatures and maintain them all operated until contact $t'$ is broken, which will not occur until winding II of relay T has been energized, by another charge from condenser C17, which will only be built up when the call signal for this receiver circuit is again transmitted several times in succession, such as at the end of the message to release this receiver circuit. Thus for all further discussions of the circuit in Fig. 8 the armatures of relay U, namely: $u1$ blocking the printer 49, $u2$ connecting all the terminals 1′, 3′ and 5′ to the front contact of $g$, $u3$ in the repetition device circuit 48 at the right of Fig. 8; $u4$ to the repetition counting chain relays in circuit 48, and $u5$ in the selector circuit to relay T, will all be in the positions other than those in Fig. 8 connecting the essential parts of the repetition device and recording portion of the receiver circuit to current sources. Now with a properly energized and selected receiver circuit at a station, the traffic signals may be recorded, and errors or mutilation of the traffic signals will be detected and requests-for-repetition thereof will be sent out, such operation for requests-for-repetition also being called "automatic RQ" operation.

7. REPETITION DEVICE

Referring back again to the detection of an error or mutilation of one of the signal element potentials and to the fault finding relay K (at the right) in the testing circuit 47 in Fig. 8, the operation of its armature $k$ in the repetition device circuit 48 (see center of Fig. 8) removes positive potential from terminal 150 to relays J and R and connects them to a negative potential terminal 152 to complete a circuit therefrom through resistance R25, front contact of $k$, polarized relay J, winding I of polarized relay R, back contacts $c5$ and $a6$, conductor 151, back contact $g$, and relay I, resistance R18 to ground, during the interval of element VIII of the eight-element signal which contained the mutilated signal element. This circuit being of negative potential, does not energize relay I to operate its armature from the position shown in Fig. 8, but it does now operate relays J and R. Relay J operates armature $j$ in the printer circuit 49 to connect it to the ground and block it from recording during the repetition cycle and at the same time armature $j$ breaks the circuit through condenser C17 and relay T of the selector 50 circuit to prevent this circuit from cutting out the receiver circuit when a repetition is in progress. Since relay J is a polarized relay it stays energized as long as the fault finding relay K is energized, which latter relay remains energized all during the time of the repetition cycle, which takes the time of substantially four eight-element signals, see vertical lines for relays J and K in receiver B in the time diagram of Fig. 20.

Relay R, now operates its armature $r$ connecting the repetition device chain relays N, O, P and Q to negative potential through contact $u4$, to start this chain in operation, each of which relays N, O, P and Q is held energized for the period of about eight elements or 160 ms., see time chart of Fig. 13. The circuit for energizing relay N is from negative potential through armature $u4$, front contact of $r$, conductor 170, back contact of $q1$, conductor 171, back contact of $o1$, conductor 172, winding I of relay N, resistance R36 to positive potential. This relay N operates its holding contact $n1$ to its winding II, opens contact $n2$ in the circuit to winding II of fault finding relay K to prevent it from operating its armature $k$ to de-energize relay J, and operates armature $n3$ (at the right of Fig. 8) in the repetition circuit 48, to connect a positive potential from terminal 180 to conductor AC through the circuit R38, conductor 181, front contact of $n3$, back contact of $p3$, front contact of $u3$, conductor 182, back contacts $mu3$ of the other receivers at this station (if there are more than one receiver as in the case of network operation), to conductor AC leading to the near transmitter, see circuit of Fig. 14. (The armature having the prefix "$m$" to their reference characters shown at the lower right hand corner of Fig. 8 in the repetition device circuit 48 correspond to each of the other receivers at this station for the armatures $n3$, $p3$ and $u3$ and are in parallel with each other and are operated by these other receiver circuits in the same manner as the corresponding armatures of the circuit here described). This positive impulse in conductor AC will cause the near or local transmitter to transmit over the special signal element of its next transmitted signal of eight-elements, a positive warning or space signal (W) which is an indication that an error has occurred in reception, and that when the far receiver receives this warning signal (W), that a repetition of the faulty or erroneous signal will be made. The circuits for this will be described later with the circuit of the transmitter in Fig. 14.

If an error had not occurred and armature $n3$ had not been moved, then a negative potential would have been connected to the conductor AC as shown in Fig. 8, from negative terminal 183, through resistance R39, back contacts of $n3$ and $p3$ and front contact of $u3$ through conductor 182, back contacts of $mu3$ of the other receivers, to AC. Since one station cannot receive traffic from more than one other station at one time, all of the other $mu3$ contacts will not be operated. This is because each of the receivers is tuned to receive the high frequency carrier from one other station only, and therefore none of the other receivers at this station are selected for traffic by signals which would operate the selector relay U of any of the other near receivers at this station.

Relay R remains energized with its armature $r$ against its front contacts until the time interval of element VI is reached for the eight-element signal following the eight-element signal having the error, at which time relays A and G are de-energized and relay C is still energized so that a circuit is completed from negative potential 152, resistance R25, winding II of relay R, front contact of *c5*, back contact of *a6*, conductor 151, back contact of *g*, relay I resistance R18 to ground, which circuit does not effect the operation of relay I but moves the armature *r* of relay R back to the position shown in Fig. 8 to make the next step along the counting chain of relays N, O, P and Q. This step completes a circuit from negative potential through armature *u4*, back contact of *r*, contact *n1*, winding II of relay N, conductor 173 and winding I of relay O to positive potential. Both relays N and O are now energized, and relay O operates its two armatures *o1* in its holding circuit to its winding II and *o2* in the circuit to relay K to keep it from operating after relay N falls out when relay R is operated again during the time interval of element VIII of this eight-element signal (see Fig. 13). When relay R energizes again by the switching over of armature *c5* during the time interval of operation of the VIIIth element, armature *r* moves again to its front contact, breaking the circuit through contact *n1* to relay N and also through contact *o1* which now connects winding II of relay O through conductor 174 in series with winding I of relay P, energizing relay P (see Fig. 13). Relay P operates its armatures: *p1* in its holding circuit to its winding II, *p2* in the testing circuit 47 to apply positive potential to conductor 122 to operate relay M so as to break the circuit through winding I of relay K so relay K can release when winding II thereof is energized, and *p3* to break the circuit from negative potential to conductor AC to the local or near transmitter and start transmission of correct (OK) signals of negative potential during the time interval of signal element VII of the following eight-element signal, so further repetitions will not be requested.

During the time interval of the following VIth element of the present eight-element signal (see Fig. 13) relay R is again returned to its back contact shown in Fig. 8, and this drops out relay O by breaking the circuit through conductors 170 and 171, and energizes relay Q through its winding I, holding relay P energized through its winding II until relay R is again energized during the time interval of the following VIIIth element of this eight-element signal. The energization of relay Q is from negative potential, contact *u4*, back contact of *r*, conductor 175, contact *p1*, winding II of relay P, conductor 176, winding I of relay Q, to positive potential. Relay Q moves its armature *q1* to its holding winding II, and opens contact *q2* in the circuit of fault finding relay K of testing circuit 47 to still prevent the operation of relay K until after relay Q drops out.

When relay R is energized for the last time during the repetition cycle (see Figs. 8 and 13) which occurs during the time interval of the VIIIth element of the next eight-element signal, relay P drops out and only relay Q remains energized through its winding II and contact *q1*. When relay Q drops out during the time interval of the VIth element of the next eight-element signal, it still does not permit the energization of winding II of the fault finding relay K because the circuit from positive potential at the bottom right of Fig. 8 through resistance R33, now closed contacts *o2*, *q2*, *n2*, winding II of relay K, conductor 177, contact *b6*, and conductor 178, leads to the now open contact *a1* and then through armature *e* to negative potential. Since this circuit cannot be completed until contacts *b6* and *a1* are closed and armature *e* is against its back contact as shown in Fig. 8, relay K will not release until the time interval of the following IInd element of the next eight-element signal when this condition occurs (see Fig. 12). As soon as fault finding relay K moves its armature *k* into the position shown in Fig. 8, relay J still does not de-energize because the positive potential circuit through relay J is not completed until the next time interval of the following VIIIth element of that whole signal (see Fig. 20). Now that this occurs, normal operation resumes as has been described above, until another error or mutilation is detected.

During this repetition cycle no testing of the signals being received after the signal which was mutilated or in error are made until the mutilated signal is repeated, and then it is automatically verified or tested again. This prevents undue delay for the repetition of signals which are not even recorded by the printer.

The special signal element VII, when it is received from another transmitter, is passed immediately from the converter circuit 43 through conductor 84, front contact of *f*, back contact *b2*, contact *d2* (of the distributor contact tree) through conductor 115 to condenser S of the distributor. Since the mutilation or error in such a special signal is not as important as mutilation or error in the traffic signals the charge on condenser S is not tested or normalized in the receiver circuit, but instead the charge on condenser S is immediately conducted through conductor 190 to one of the manually three pre-selected BC conductors which leads to the near or local transmitter, where negative and the absence of negative charges are detected as will be described later in connection with the transmitter circuit of Fig. 14.

This completes the detailed description of a receiver circuit according to the frequency modulated marks, spaces and intermediate frequency signal elements according to this invention.

B. *Transmitter circuit*

Now the detailed circuit of the operation of a corresponding transmitter will be described:

The message which has been received and described above is modulated on a high frequency carrier electromagnetic wave at a distant station by a transmitter which has a circuit similar to that shown in Figs. 7 and 14. The original five unit Baudot code signal is recorded on a tape having places for five holes transversely of the tape so that for example a hole in the tape corresponds to a mark, and the absence of a hole corresponds to a space. This tape is then fed in steps by keyer magnet H*k* according to each transverse row of five units, through the keyer device 61 comprising a keyer K*e* or feeler which detects the holes in the tape by pushing fingers through the tape to operate the armatures *ke1* through *ke5* shown at the upper left corner of Fig. 14. When a finger of the keyer moves through a hole in the tape, it operates a corresponding armature *ke* to change its contact from its back contact over to its front contact.

1. TRANSMITTER MULTIVIBRATOR

Before further describing the operation of the keyer circuit 61, the operation of the relays P*t* and J*t* must be described, and this operation depends upon the turning-on of the whole transmitter circuit of Fig. 14. Therefore, reference must first be had to the multivibrator circuit M*u*T*r* or 67 in the upper right corner of Fig. 14 which, as herein disclosed starts vibrating at a frequency of 25 times per second to make two 20 ms. time elements each cycle, as does the multivibrator M*u*R*e* in the receiver circuit of Fig. 8. In the case of link operation where there are only two stations, either one of the two transmitter multivibrators may act as the master multivibrator for synchronizing the whole link system, and accordingly the manual switch MS is provided in the conductor 91 (upper right corner of Fig. 14) and is closed at the station which is not the master station so that its multivibrator is in synchronism with the received signals for the purpose of properly timing the sending of special signal elements to the master station. In the case of network operation, only one station has the manual switch MS open as shown, and that is the one master station whose transmitter multivibrator synchronizes all the multivibrators of all of the other stations through their receivers to their transmitters and thence back to the receivers of the master station. For this description, the circuit of Fig. 14 may be considered as having a multivibrator M*u*T*r* which controls the synchronism of the multivibrator M*u*R*e* in Fig. 8 through the "stop" and "start" elements of the eight-element signal transmitted from the circuit of Fig. 14.

Since the transmitter multivibrators are kept in synchronism through the connection 91 to the receiver multivibrators, or else it is a master multivibrator, there is no need to provide any electrical connection between it and the transmitter circuit to control its time elements, and only three polarized relays E*t*, F*t* and W*t* are connected with their windings I in series with the output of vacuum tube B5*a* and with their windings II in series with the output of the vacuum tube B5*b*. Relays E*t* and F*t* oscillate each 20 ms. to move their armatures *et* (below relay A*t*) and *ft* (upper center of Fig. 14 left of circuit 64) in the distributor circuit 63; one to operate the counting chain relays A*t*, B*t*, C*t* and D*t* and the other to distribute the potentials from the condensers C1 through C15 (see center of Fig. 14) to the converter generator circuit 64 which in this modification of this system is a frequency shift generator FSG. Relay W*t* oscillates its armature *wt* (lower left corner of Fig. 14) to control the sequence of operation of the storage device 62 and repetition device 66, and through these circuits also the timing of operation of the keyer 61.

2. SETTING-UP OF TRANSMITTER DISTRIBUTOR AND STORING DEVICE CIRCUITS

Referring to Fig. 15 the relationship is shown when or during what interval of operation of the time elements of an eight-element signal, the multivibrator relays E*t*, F*t*, W*t* are operated in relationship with the operations of the distributor counting chain relays A*t*, B*t*, C*t* and D*t*, and the storing device control relays I*t* and J*t* which said multivibrator relays control. As soon as the current of the transmitter circuit of Fig. 14 is turned on, the multivibrator starts operating and the distributor counting chain relays A*t*, B*t*, C*t* and D*t* start their counting cycle, which determine the timing of the operation of the keyer 61, storing device 63 and repetition device 66 as well as that of the distributor 63 itself.

During the time interval of operation of the first signal element I, armature *et* moves to its front contact connecting negative potential from terminal 220 (in the distributor counting chain circuit at the lower right of Fig. 14) through front contact *et*, conductors 221 and 222, back contact *dt*1, conductor 223, winding 1 of relay A*t*, resistance R69, conductor 224 to positive terminal 225. This energizes relay A*t* to operate its armatures: *at*1 to its holding winding II, *at*3 in the distributor contact tree at the top center of Fig. 14, and *at*5 in the control circuit for repetition device control relay X*t* at the lower left corner of Fig. 14. Each oscillation of the armature *et*, operates another of the distributor counting chain relays in a manner similar to that specifically described for the distributor counting chain of relays A, B, C, and D in the receiver circuit of Fig. 8, and their times of operation are graphically illustrated in Fig. 15. Relay B*t* operates its armatures: *bt*1 to its holding winding II, *bt*2 in circuit of keyer stepping magnet H*k* in circuit 61, *bt*3 and *bt*4 in the contact tree of the distributor circuit 63, *bt*5 (at about the center of Fig. 14) to time the mutilation of a signal after a warning signal (W) has been received requesting repetition, and *bt*6 to control the operation of storing device control relay J*t* in the lower portion of circuit 62. Relay C*t* operates its armatures: *ct*1 to its holding winding II, *ct*2 to control the operation of the keyer circuit 61 in circuit of stepping magnet H*k*, *ct*3 and *ct*4 in the contact tree of the distributor circuit 63, and *ct*5 (lower left corner of Fig. 14) in the circuit of repetition control device relay X*t*. Relay D*t* operates its armatures: *dt*1 to its holding winding II, *dt*2 in circuit of relay J*t* of storage device circuit 62, and *dt*3 in the contact tree of the distributor circuit 63.

Before any five unit signal indication from the keyer 61 can be transmitted to the storing device 62, relay J*t* at the lower right of Fig. 14 in the storing circuit must operate, which occurs during the first or "start" element of the eight-element signal being transmitted, when neither counting chain relay B*t* nor relay D*t* is operated, and relay W*t* is operated away from the position shown in Fig. 14. The circuit for the operation of relay J*t* is completed from ground terminal 230 at the lower left of Fig. 14, through front contact W*t*, conductor 231, back contact *bt*6, conductor 232, back contact *dt*2, relay J*t*, contacts *rt*4, *st*4 and *ut*4, resistance R76 to negative terminal 233. Thus, the conductors 211 through 215 between the keyer and the storage device are closed only during the first time element of each eight-element signal through the closure of contacts *jt*1 through *jt*5 by relay J*t*.

During the time interval of the IVth element of the same eight-element signal, a circuit is completed from ground 230, back contact of *wt*, contact *ct*5, front contact *at*5, winding I of polarized relay X*t*, conductor 234, winding I of polarized relay V*t* and resistance R72 to positive terminal 235, which energizes relay X*t* to operate its armature *xt* in the storage device circuit 62 to the right of relay I*t*. This positive current through winding I of the polarized relay V*t* only urges its armature *vt* more against the contact shown at the left side of the repetition device circuit 66 in Fig. 14 so that this circuit is not set into operation thereby at this time. Relay X*t* remains energized during normal two-way traffic operation or during the proper reception of correct (OK) special signal elements over conductor BC (lower left corner) from the near receiver, until the time interval of the VIth element, when a circuit is completed from ground terminal 230 through back contact *wt*, contact *ct*5, back contact *at*5, winding II of relay X*t*, back contacts *rt*6 and *tt*3, resistance R74 to conductor BC. This circuit during correct (OK) operation, has a negative potential which is the charge of the correct (OK) signal on condenser S in the distributor circuit 44 of the near receiver circuit, to operate the relay X*t* and move its armature *xt* back into the condition shown in Fig. 14. Thus according to the time diagram of Fig. 15, relay X*t* is de-energized before relay I*t* is operated which prevents a request-for-repetition signal from being transmitted to the reception device and the starting of said device into operation.

Thus, when relay B*t* drops out and relay D*t* still remains energized, during the time interval of the VIIth element of this eight-element signal, a circuit is completed from ground terminal 230 through front contact *wt*, conductor 231, back contact *bt*6, conductor 232, front contact of *dt*2, conductor 236, back contact of *xt*, conductor 237, winding I of polarized relay I*t*, back contacts of *st*3 and *ut*3, conductor 238, resistance R71 to positive terminal 239, thereby energizing relay I*t* during the time interval of the element VII, to operate its armature *it* (just above relay I*t*) to start the keyer into synchronous operation, if this is the first signal being run through the transmitter circuit, and primarily to operate the storage device counting chain relays K*t*, L*t*, M*t* and N*t*, once each successive eight-element signal, in rotation, to change the five contact trees to the five groups of three condensers C1 through C15 in the storage circuit near the center of Fig. 14.

3. KEYER

During the time interval of this VIIth element when armature *it* is against its front contact (opposite from that shown in Fig. 14), negative potential from the terminal 250 is conducted through front contact *it*, conductor 251 closed contacts *qt'''*, *qt''* and *qt'*, winding I of relay P*t*, resistance R65, conductor 224 to positive terminal 225. The contact *qt'''* is a contact closed when the tape in the keyer device is not too taut, contact *qt''* is a contact closed when the perforated paper tape is in the keyer, and contact *qt'* is a manually closed contact which is closed when the tape in the keyer is properly in place and a message thereon is ready to be sent. Thus, it can be assumed that at this time all of these three *qt* safety and manually controlled contacts are closed, and it should be noted that as soon as any of them is broken, due to failure or jamming of the tape or at the volition of the operator, that the keyer will be stopped and transmission of that message discontinued, in that relay P*t* must be energized before any traffic can be sent from the keyer.

The operation of the relay P*t* operates its armatures: *pt*1 in the circuit to the stepping magnet H*k* of the keyer, *pt*2 to remove positive potential from both sides of the contacts *ke*1 through *ke*5 of the keyer and place negative potential on one side of each of said contacts *ke*, and *pt*3 in the circuit to the holding winding II of relay P*t*. Once relay P*t* is energized, it remains energized, alternately through armature *it* either through its winding I as explained above or through its holding winding II by the circuit from negative potential 250, back contact *it*, contact *pt*3, winding II of relay P*t*, resistance R66, conductor 224 to positive terminal 225, until one of the contacts *qt* is opened. Thus as soon as the keyer jams or it is stopped of the transmission of a message is completed, "idle time" signals, corresponding to five spaces or negative traffic signal elements, are transmitted from the circuit of Fig. 14.

When contact *pt*2 (mid left edge of Fig. 14) is held against its front contact during the energization of relay P*t*, positive potential, corresponding herein to spaces, is connected from positive terminal 200, through resistance R60, conductor 201, only to each of the back contacts *ke*1 through *ke*5 connected in parallel to the conductor 201; and negative potential corresponding herein to marks, is connected from negative terminal 203, through resistance R61, front contact of *pt*2 and conductor 204 to each of the front contacts *ke*1 through *ke*5. Thus, when a finger of the keyer finds a hole in the perforated tape fed through the keyer mechanism, said finger will also move the corresponding *ke* contact from its back or positive potential contact to its front or negative potential contact, to connect a negative instead of a positive potential to its corresponding conductor 211 through 215 to the storing device 62 when the relay J*t* is operated closing all of its contacts *jt*1 through *jt*5.

The keyer operates to maintain the feelers which operate the contacts *ke*1 through *ke*5 in the perforations or holes in the tape until the magnet H*k* steps the tape into its next position, so that the connections through the contacts *ke* will be maintained until the contacts *jt* are closed.

Since contact *pt*2 has not been operated to discontinue the transmission of "idle time" signals until after the time interval of the VIIth time element of the first eight-element signal through the transmitter, the code signal on the tape in the keyer is not transmitted until the following "start" element of first time interval of operation of the following eight-element signal, when the contacts *jt*1 through *jt*5 are closed, as described above. Then during the course of this second eight-element signal and before the next "start" signal element occurs, the stepping magnet H*k* of the keyer is operated by closing the circuit through it during the time intervals of the IInd and IIIrd elements (see Fig. 15 for a chart of the time) when relay B*t* is energized and relay C*t* is not yet energized. This circuit through the stepping magnet H*k* is from negative terminal 205, magnet H*k*, closed contacts *rt*2, *st*2, *ut*2, *bt*2, *ct*2 and *pt*1, and resistance R62 to positive terminal 206. The operation of this magnet steps the tape through the keyer to the next transverse row of five unit code perforation indications so it will be ready for controlling the operation of the contacts *ke*1 through *ke*5 to convey the proper next traffic code signal to the storage device 62 when the time for the next "start" element occurs.

4. STORING DEVICE

The operation of armature *it* from the position shown in Fig. 14 in the storage device circuit, during the time interval of the element VII, also starts the counting chain relays K*t*, L*t*, M*t* and N*t* of circuit 62 into operation. Negative potential from terminal 250 is conducted through front contact *it*, conductors 252 and 253, back contact *nt*1, conductor 254, back contact *lt*1, conductor 255, winding I of relay K*t*, resistance R67, and conductor 224 to positive terminal 225. The energization of relay K*t* operates its armatures *kt*1 to its holding winding II, and contacts *kt*2, *kt*3 and *kt*4 in the contact trees to three groups of condensers C1 through C9. The other relays of this counting chain are energized in accordance with the times shown in diagram of Fig. 16 and through circuits similar to those described above for the operation of the counting chain of relays N, O, P and Q of the repetition device circuit 48 in Fig. 8 of the receiver circuit. Each of these relays L*t*, M*t* and N*t* close circuits to their holding windings II and operate two or three contacts in the counting trees to the condensers C1 through C15 of the storage device. Thus, the traffic elements of the first of the three eight-element signals to be transmitted have their corresponding charges from the keyer circuit placed on the five condensers C1, C4, C7, C10 and C13, the next five traffic elements of the next eight-element signal have their corresponding charges placed on condensers C3, C6, C9, C12 and C15 due to the operation of relays K*t* and L*t*; and the third traffic signal of five elements will have its corresponding charges placed on condensers C2, C5, C8, C11 and C14 due to the operation of relays M*t* and N*t* and the de-energization of relays K*t* and L*t*. The pair of relays K*t* and L*t* does not operate at the same time as the pair of relays M*t* and N*t* (see Fig. 18) in order to give sufficient time for the charges to be successively distributed from the condensers to the converter circuit 64, or herein Fig. 14 the frequency shift generator FSG. Thus these relays remain energized sufficiently long to permit the charges thereon to be transmitted, and also to be restored on said condensers after the transmission, so that they will remain in the event they need to be repeated because of an error in the reception of one of the traffic signals at the far station. The charges, therefore, are not removed from the condensers C1 through C15 until the third signal thereafter is placed upon them directly from the keyer 61.

Since armature *it* is closed during the time interval of the VIIth element of an eight-element signal (see Fig. 15), and it operates to energize relay K*t* and then energizes relay L*t*, when the armature *it* returns to the position shown during the time interval of the VIIIth element (see Fig. 16); and since these relays K*t* and L*t* are not de-energized until armature *it* is again operated at the end of the following eight-element signal, the condensers C1, C4, C7, C10 and C13 will remain connected to conductors 261 through 265 connected to the distributor circuit 63 during the whole time interval of the first six elements of the following eight-element signal. It is during this time that these charges are distributed successively to the converter 64 for modulation and transmission, and their condensers are re-charged similarly again for storing for the time of transmitting three eight-element signals, which time is 480 ms. or about a half of a second.

5. TRANSMITTER DISTRIBUTOR

The eight-element signal is made up at the distributor by first connecting a positive potential from terminal 270 (see upper left center of Fig. 14) through conductor 266, back contacts of *bt*3 and *dt*3, front contact *ft* to junction 280 to operate charge restoring polarized relay G*t* and to connect a constant negative potential, corresponding to a space or "start" signal (see interval of element I in Fig. 15, F*t* being operated) to the converter circuit 64. During the time interval of element II the first traffic signal element "1" may be from condenser C1, C2 or C3 but for simplicity condenser C1 will be chosen so that its charge is conducted through back contacts *mt*2 and *kt*2, conductor 261, back contact *ct*3, front contact *at*3, back contact *ft*, junction 280 to relay G*t*. During the time interval of element III, the traffic signal element "2" is conducted from condenser C4 through back contacts *mt*3 and *kt*3, conductor 262, front contact *bt*3, back contact *dt*3, front contact *ft* to junction 280 to relay G*t*. During the time interval of element IV, traffic signal "3" is connected from condenser C7 through back contacts *mt*4 and *kt*4, conductor 263, front contacts *ct*3 and *at*3, junction 280 to polarized relay G*t*. During the time interval of the element V, traffic signal "4" is connected from condenser C10 through back contacts *nt*2 and *lt*2, conductor 264, front contacts *bt*4, *dt*3 and *ft*, junction 280 to relay G*t*. During the time interval of the element VI, traffic signal "5" is connected from condenser C13 through back contacts *nt*3 and *lt*3, conductor 265, front contact *ct*4, back contacts *at*3 and *ft*, junction 280 to relay G*t*. During the time interval of the element VII, the special signal is connected from conductor AC of the near receiver, also connected to a condenser C38 in Fig. 8, through conductor 267, back contact *bt*4, front contacts *dt*3 and *ft*, junction 280 to relay G*t*. By the special signal element VII the correct (OK) and warning (W) or requests-for-repetition signals are transmitted to a far transmitting station to control its operation. During the time interval of the last or VIIIth element, the "stop" signal of negative potential is connected from terminal 268 through resistor R59, conductor 269, back contacts *ct*4, *at*3 and *ft*, junction 280 to relay G*t*. Thus each of the eight time elements of 20 ms. each, of each eight-element signal is connected sequentially to the junction 280 and through relay G*t* to ground to operate the armature *gt* (above relay G*t*) of this polarized relay either in one direction or the other depending upon whether the current connected to it is positive or negative. If the current to relay G*t* is negative corresponding to a mark, armature *gt* is operated to connect a constant source of negative potential from terminal 281 through resistance R56, front contact *gt*, to the junction 280 and through this junction replenish the charge on the condenser then also connected to junction 280, which condenser just operated the relay G*t*. Armature *gt* also connects this same charge from terminals 281 or 282 through junction 280 and conductor 300 back contacts of either *bt*5 or *rt*5, resistance R53, conductor 302 to the junction 301 of the frequency shift generator circuit 64.

6. CONVERTOR GENERATOR

The frequency shift generator circuit FSG is similar to the multivibrator circuit described above for the receiver in Fig. 8 but this converter multivibrator is herein selected to oscillate at about a middle audio frequency of about 1500 cycles per second. The negative and positive potentials successively connected to the junction 301, respectively lower and raise the frequency of this multivibrator converter circuit between about 30 cycles and about 425 cycles, and preferably about 200 cycles, but preferably always the same amount in each direction to produce a modulated audio frequency electromagnetic wave which is taken off through the transformer T3 from the anodes of the two tubes B6*a* and B6*b*, across the terminals 3 and 4 which are connected to the high frequency radio or other type of transmitter 65 (see Fig. 7). The voltage potential levels applied at junction 301 determine the amount of change in the frequency of the wave, and this change in frequency continues as long as one of these potential levels is applied thereto, similar to the advancing and delaying of the time elements previously described in connection with the synchronization of the receiver multivibrator M*u*R*e* in Fig. 8. Thus, each element of each eight-element signal having a preselected positive or negative potential level produces a corresponding frequency of vibration or oscillation of the converter circuit 64 corresponding to marks and spaces. When a third or no potential level is applied to the junction 301, frequencies (corresponding to faults or mutilations) which are neither marks nor spaces and may be middle frequency signals, are used for positively transmitting faults as will be described later. These three types of converted signals are the final signal elements which are transmitted from this station to other stations, either directly over a cable or modulated on the given high frequency carrier wave for radio or cable transmission. This high frequency carrier wave has a frequency in network operation which may identify this station, and such modulated signals are those which are received by the properly tuned receivers at each of the other stations of a network.

7. TRANSMITTER REPETITION DEVICE

Now if a fault, mutilation, or no signal at all has been received at the station to which this transmitter of Fig. 14 is transmitting signals and as a result thereof a warning signal (W) has been sent back over the special signal element VII of the next following signal from that far station, which special warning signal (W) is received at this station and conducted to the present transmitter circuit of Fig. 14 as a positive potential on the conductor BC (see lower left corner of Fig. 14), then another sequence of operation occurs which stops the keyer 61 from storing more signals on the condensers C1 through C15 of the storing device 62, causes a mutilated signal of a middle frequency to be transmitted from this station from FSG, and has the signals already stored in the storing device 62 retransmitted to the far station until said far station indicates that the signal has been received correctly by transmitting at the proper time a correct (OK) signal over element VII.

When a positive or no potential corresponding to a warning signal (W) or request-for-repetition, is applied to conductor BC, the polarized relay X*t* does not drop out during the time interval of operation of VIth element as shown for a correct (OK) signal operation in Fig. 15, but instead relay X*t* is held in operation for an additional eight more elements (see Fig. 17 and Fig. 20, transmitter A vertical column X*t*), or until a sufficient negative potential is again detected on conductor BC to overcome the polarity of relay X*t*. Considering that the polarized relay X*t* does not drop out, and its armature *xt* (to the right of relay I*t* in the storing circuit) is thus held against its front contact during the time interval of the following VIIth element, so that relay I*t* is not energized as it usually is and as described above for no repeat operation (see dotted time line for I*t* of transmitter A in Fig. 20), this failure of relay I*t* to now operate delays the operation of the storing device counting chain relays K*t* and L*t* for another whole signal of eight elements (see time chart of Fig. 18). Then during the time interval of operation of this VIIth element, a new circuit is completed from ground 230, front contact *wt*, conductor 231, back contact *bt*6, conductor 232, front contact *dt*2, conductor 236, front contact *xt*, conductors 240 and 241, winding II of polarized relay V*t*, resistance R71 to positive terminal 239, thus operating relay V*t* to move its contact *vt* (at the left center of circuit 66 in Fig. 14) to start the operation of the repetition device 66 counting chain relays R*t*, S*t*, T*t* and U*t*. Polarized relay V*t* remains so operated until the next positive potential is connected through its winding I and winding I of relay X*t*, which is during the time interval of the next following IVth element, during which time element the second of the repetition counting chain relays S*t* is energized in series with the first. The operation of the relays of this repetition counting chain is the same as that for the relays of distributor count chains of either relays A, B, C and D of the receiver circuit in Fig. 8 or of relays A*t*, B*t*, C*t* and D*t* of this transmitter circuit, except for the fact that the repetition rate is only once per eight-element signal instead of once per element. This timing is diagrammatically illustrated in Fig. 17 in relationship with the operation of armature *vt* of relay *Vt* which controls the operation of said repetition counting chain relays.

The energization of relay R*t* operates its armatures; *rt*1 to its holding winding II, *rt*2 in the circuit of the stepping magnet Hk of the keyer 61 to stop the keyer during the repetition cycle, *rt*3 and *rt*5 in the distributor circuit 63 (about center of Fig. 14) to set up a circuit to connect ground or no potential to converter generator FSG to send a middle frequency or positively mutilated signal, *rt*4 in circuit to relay J*t* (lower right of Fig. 14) to prevent its operation during the repetition cycle, and *rt*6 in circuit of conductor BC to relay X*t* to prevent this relay from detecting any signals, either correct (OK) or warning (W), until the repetition cycle is completed, because any such errors which may be transmitted during the repetition cycle will not be recorded anyway and detection of an error during this repetition would just delay the transmission of the message that much more unnecessarily.

The energization of relay S*t* operates its armatures: *st*1 to its holding winding II, *st*2 in the circuit of the stepping magnet H*k* of the keyer to maintain the keyer inoperative during the repetition, *st*3 (below relay I*t*) to connect relay I*t* in series with relay V*t*, and *st*4 in the circuit of relay J*t* to maintain it inoperative during the repetition cycle. The energization of relay T*t* operates its armatures *tt*1 to its holding winding II, and *tt*3 in the circuit of winding II of relay X*t* to insure the normal operation of X*t* during the repetition cycle and prevent further delays therein due to errors when the receiver is not even receiving the signals during said cycle thereby avoiding further and unnecessary delay. Energization of relay U*t* operates its armatures: *ut*1 to its holding winding II, *ut*2 in the circuit of the stepping magnet H*k* of the keyer 61 to still prevent its operation until the end of the repetition cycle, *ut*3 in the circuit of relay I*t* to connect it in series with the operation of relay V*t* during the latter's last energization in the repetition cycle, and *ut*4 in the circuit of relay J*t* to still prevent its operation during the repetition cycle.

The operation of armatures *rt*3 and *rt*5 in the distributor circuit 63 to cause a middle frequency signal to be transmitted corresponding to a mutilation, breaks the circuit between the junctions 280 and 301 when relay B*t* is energized operating its armature *bt*5 and completes a circuit from ground terminal 310 through front contacts *rt*3, *bt*5, resistance R53, conductor 302, to the junction 301 of the converter generator 64, which ground potential at this connection causes a middle frequency to be transmitted during the whole time that relay B*t* is operated, namely, during the time interval for signal elements II through VI, or during all of the five traffic signal elements "1" through "5." This middle frequency throughout one complete traffic signal of five elements produces a fault mutilation indication at the far receiver and causes that far receiver to block its printer for the following sequence of three whole eight-element signals. But since the printer at the far receiver has already been blocked by the mutilation received which caused the warning signal (W) to be sent to this station and start this repetition, this positive transmitted mutilation will not be received and will have no effect at the far station. The only reason for sending this definitely mutilated signal to the far receiver, is to block that receiver in the event a traffic signal had not been mutilated and the correct (OK) signal from that far station has been mutilated instead to such an extent that sufficient negative potential was not on conductor BC to cause this relay X*t* to drop out when it should before the relay I*t* was to be energized. In such an event of mutilation or error in reception of the special correct (OK) signal from the far station, a repetition would commence and would be transmitted from this station, which, if the far receiver had not been blocked, would cause a recorded repetition of the traffic signals there for the three whole signals which were repeated. Thus, the sending of the definitely mutilated signal from the transmitter as soon as its repetition device has been operated, insures that no undesired duplication of recorded signals will be made at the far station. Accordingly, the mutilation of a traffic signal by the transmitter when it is to repeat three signals, is merely a precautionary measure to guard against mutilated special signal elements which have the effect of warning signals requesting repetition, and thereby prevent any duplication at the far receiver of the message in the event a signal was not actually mutilated at the receiver.

The second operation of polarized relay V*t* during the time interval of the VIth element of the next eight-element signal of the repetition cycle, however, is not directly through the circuit just mentioned above for relay V*t*, but is through a circuit in series with polarized relay I*t*. No further warning signal (W) or positive potential can now be detected on conductor BC to change this series circuit operation during this repetition because this circuit is held at negative potential 242 through resistance R73 until the repetition cycle has been completed by means of contacts *rt*6 and *tt*3 (see Fig. 17). This second operation of I*t* during the time interval of the VIIth element of the next eight-element signal is caused by a circuit from ground terminal 230 (at the lower left corner of Fig. 14) front contact of *wt*, conductor 231 back contact *bt*6, conductor 232, front contact *dt*2, conductor 236, back contact of *xt* (as normal), conductor 237, winding I of polarized relay I*t* front contact of *st*3, conductors 243 and 241, winding II of polarized relay V*t*, resistance R71 to positive terminal 239. This energizes both polarized relays I*t* and V*t* in series, but as soon as armature *wt* returns to the position shown at the end of the VIIth element, the constantly connected winding II of polarized relay I*t* to negative potential terminal 245 through resistance R75, returns the armature *it* of relay I*t* to the position shown in Fig. 14. The third operation of the polarized relay V*t* during the repetition cycle is through a circuit similar to that for the second operation of this relay V*t* just described, but instead of going through the front contact of *st*3 (below relay I*t*) it goes through the front contact *ut*3. Thus relay I*t* is energized to operate the storing device counting chain relays during each of the three whole eight-element signals of the repetition cycle plus one whole eight-element signal at the first of the cycle when the mutilated signal is being sent from this transmitter, that is when the relay I*t* is not energized as previously described when relay X*t* is held over for its long period (see lines corresponding to these relays for transmitter A in Fig. 20). Accordingly, the system is delayed actually a total of four eight-element signals to take care of the case when a correct (OK) signal may be mutilated as described above, and to allow for the time delay in the transmission between two stations. Thus, the signal which was received mutilated at a far station is not wiped off the storage condensers at its transmitter and is repeated as actually and positively mutilated by the operation of contacts *rt*3 and *rt*5 in the distributor circuit 63 described above (see the indication of these signals in the first vertical column at the left of Fig. 20).

When the repetition cycle is completed and relay U*t* has dropped out, the transmission continues as described above for correct (OK) operation in that correct (OK) special signals should now again be received at the near receiver indicating that the transmission from this station to the far receiver is all right and correct, since the relay X*t* is now promptly de-energized by the correct (OK) signals so that the relay V*t* will not be re-energized until the next repetition is required. Now relay J*t* is energized again as usual, and the keyer is started and the whole circuit is in normal operation.

Figure 19:
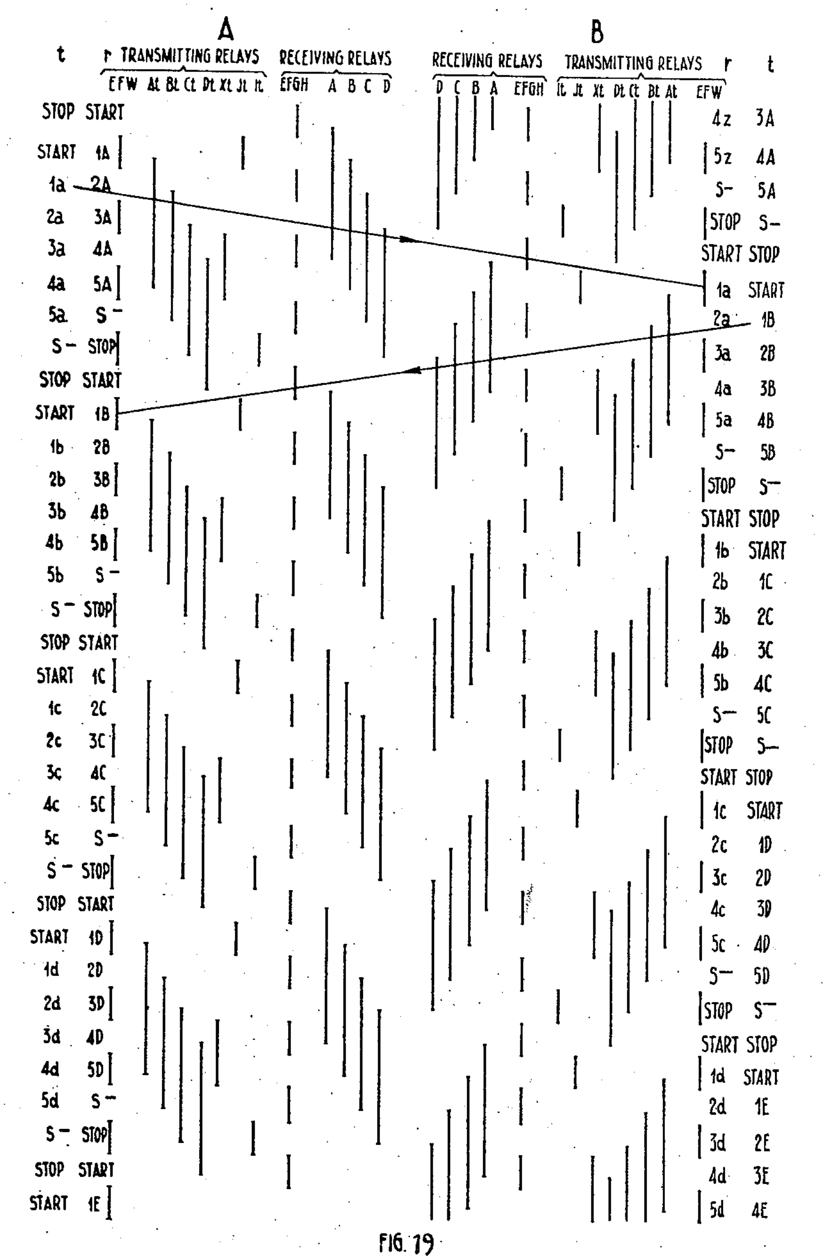
Fig. 19 is a vertical time diagram of the operation of the principal relays in both the receiver and the transmitter of two stations A and B in communication with each other under normal or correct signal transmission and reception.

Fig. 19 is a composite time diagram of the all of the relays at two different stations A and B which are communicating with each other under normal correct operation without any errors, mutilations or requests-for-repetitions. The delay in the time of transmission between the two stations is indicated by the transverse arrowed slanting lines across the diagram showing when one element is transmitted and when it is received at the other station. Only the relays which operate under normal operation are shown in this Fig. 19 which combines the timing of them with other related relays including the diagrams of Figs. 12, 13, 15 and 16, but instead, showing the time running vertically downwardly instead of horizontally to the right.

Figure 20:
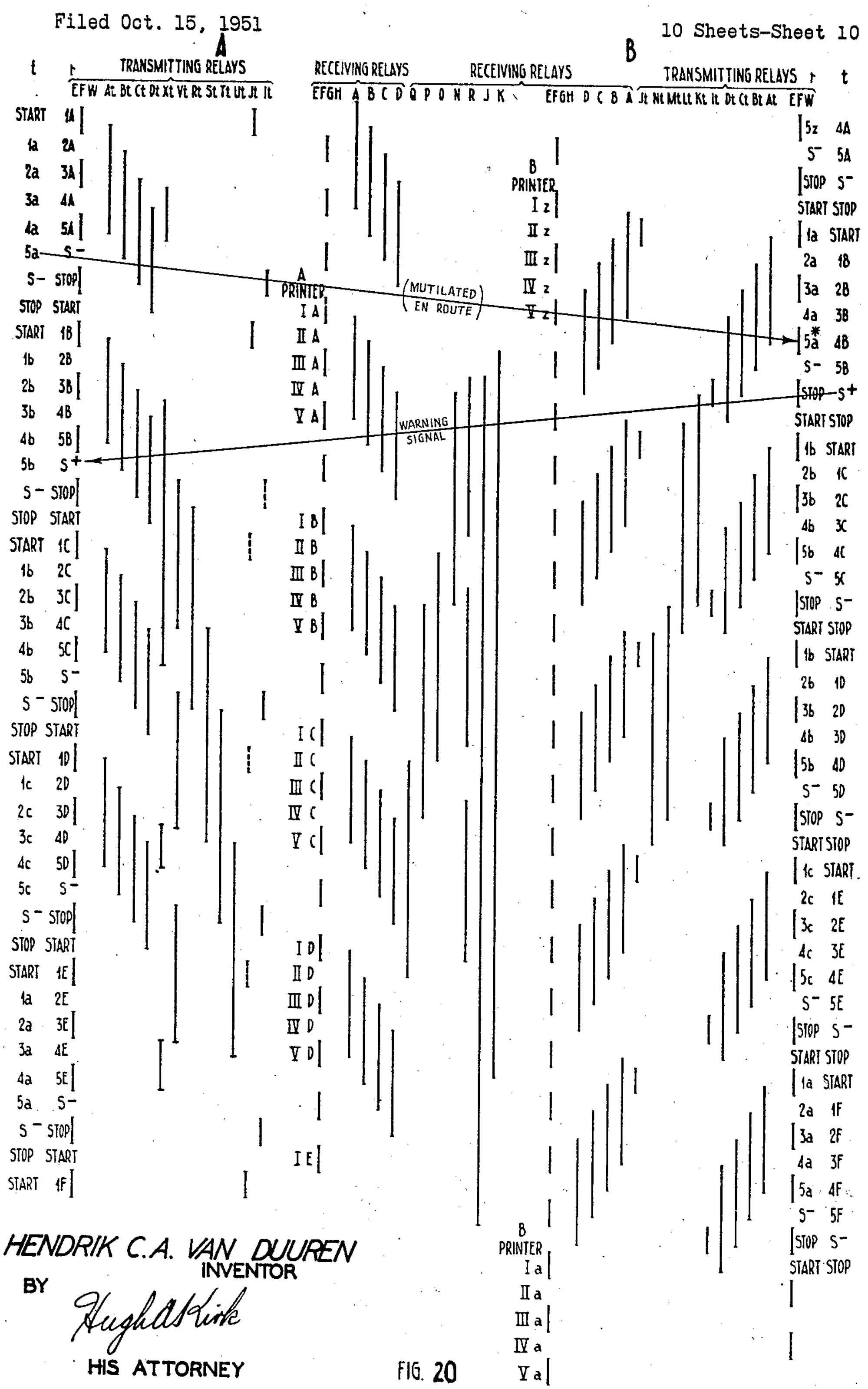
Fig. 20 is a vertical time diagram of the operation of the principal relays in both the transmitter and receiver of two stations A and B in communication with each other in the case of disturbed transmission and consequent repetition of a mutilated signal.

Fig. 20 is similar to Fig. 19 just described, but showing a mutilation of the traffic signal element "5*a*" (see starred (*) signal near top of vertical column at right of Fig. 20) which caused the sending of the positive warning special signal "S+" (two elements below and to the right) which is sent to the station A to request the repetition. The printer at station B is then stopped, and the message signal letter "b" of five traffic elements from the transmitter at station A is repeated mutilated by said transmitter, the following traffic signal letter "c" is transmitted, and then letter "a" is again transmitted, correctly received and printed. This Fig. 20 includes also the diagrams of Figs. 17 and 18 as well as all those in Fig. 19 mentioned above. Thus by following Figs. 19 and 20 every operation of two stations in a system may be followed and when each of the relays therein is operated, in relationship to the 20 ms. elements of the eight-element whole signals being transmitted back and forth between said two stations according to this invention.

C. *Modifications*

Although the circuit just described has been directed to a frequency shift modulation of the positive and negative potentials for spaces and marks, which compose the signals to be sent, the same system may be employed with other types of conversion or modulation of the spaces and marks, such as for example time modulated pulses. Converter circuits for modulating positive and negative potential signals into different types of time modulated pulses and demodulating them, are shown respectively in Figs. 21 and 23 which are adapted to be inserted for the circuits 43 and 64, respectively, shown in Figs. 8 and 14.

The time modulated marks and spaces generated and converted by the circuits in Figs. 21 and 23 may take the pulse shapes shown in Fig. 22 which are symmetrical about a vertical center line Y, the space having the peak of the pulse before said center line Y, and the mark having the peak of the pulse after said center line, while simultaneous mutilation or errors would be the absence of the peak on both sides of said center line Y.

Referring specifically to Fig. 21 for the receiver converter circuit, the same conductors are shown entering the circuit and in approximately the same position as those entering the circuit of box 43 in Figs. 6 and 8, so that one can be substituted for the other without any revision or modification of any of the rest of the circuit in Fig. 8. The incoming signal from the limiter 42 over conductor 80 conforms each 20 ms. to one of the three different types of signals illustrated in Fig. 22. These time modulated pulse signals are conducted through the coupling condenser C'1*a* and conductors 400 and 401 to armature *oo* of relay OO. This relay OO is operated at twice the frequency of the multivibrator M*u*Re in the receiver circuit so that it will break at the center of each 20 ms. signal element, i. e. graphically illustrated, to break or change-over along the center line Y in Fig. 22 to divide each incoming time modulated signal so it may be identified and properly directed through the bridge circuit of vacuum tubes B'1*a*, B'1*b*, B'2*a* and B'2*b* similar to the bridge circuit 43 in Fig. 8. This multivibrator circuit comprising vacuum tubes 7*a* and 7*b* is synchronized by the multivibrator M*u*Re of circuit 45 of the receiver circuit in Fig. 8 through the connection 402 and a coupling condenser C18 to the point *x* of the multivibrator circuit 45 (see Fig. 8). This connection is joined to the resistance R80 in Fig. 21 to bias into synchronism the operation of the multivibrator of this circuit in a manner similar to that described for the synchronization of multivibrator of circuit 45 of the receiver. In the anode circuit of the tubes 7*a* and 7*b* are winding I and winding II, respectively, of the polarized relay OO which operates the armature *oo* in the circuit of the conductor 401 to oscillate back and forth every 10 ms. Thus when a space pulse comes in on the conductor 401, through back contact *oo*, conductors 403 and 404 to charge the grid of tube B'2*b* to make this tube conductive, tube B'1*a* is also simultaneously conductive to transmit a positive potential over conductor 84 (in the manner described previously in the operation of the bridge circuit in Fig. 9) to charge positively the then connected condenser I, II, III, IV, V or S of the distributor circuit 44 in Fig. 8. And since the last 10 ms. of this space signal pulse (see Fig. 22) has no potential peak, then when the armature *oo* moves over to its front contact to connect with the grid of tube B'2*a* through conductors 405 and 406, this tube still is not made conductive and remains nonconductive to continue the positive potential as it initially had during its first 10 ms. to the chosen condenser. Similarly, a mark signal having no potential peak during its first half of duration will bias the grid of tube B'2*b* to cut-off, so tubes B'2*a* and B'1*b* will be conductive to transmit a negative charge over conductor 84 to the then connected condenser I, II, III, IV, V or S in the distributor 44 of Fig. 8 (similar to the manner described for Fig. 10), which charge will continue during the second 10 ms. of the signal element when *oo* is against its front contacts, in that when a potential peak occurs on the marking pulse to maintain the tube B'2*a* conductive. When a mutilation occurs as shown in Fig. 22, the connected condenser is first charged for 10 ms. to one potential and then charged oppositely for the remaining 10 ms. to the other potential leaving its final or summation charge zero, so that when it is tested the mutilation will be detected. Thus during the first half of the mutilated signal the condenser is charged and during the second half of the mutilated signal it is discharged. Accordingly, the conversion of time mutilated pulses is effected at the receivers in a system employing such means of modulation of the spaces and marks and mutilated signals communicated according to this invention.

Referring to the transmitter circuit of Fig. 14, the converter generator circuit 64 may be replaced exactly by the circuit of Fig. 23 to conform with the system of time modulated pulse signals just described above. This circuit in Fig. 23 comprises a multivibrator having two vacuum tubes 8*a* and 8*b* similar to that employed in the circuit of Fig. 21, which is in synchronism with the multivibrator M*u*T*r* in circuit 67 of the transmitter circuit of Fig. 14 through connection 410 but has a frequency of twice that of the multivibrator 67. The anodes of these tubes 8*a* and 8*b* are connected respectively to the windings I and II of the polarized relay TOO to oscillate its armature *too* between its two contacts each 10 ms. to supply positive potential in 110 ms. pulses as shown in Fig. 22 to the high frequency radio transmitter connected across terminals 3 and 4. The time modulation of these pulses is produced by the action of the center polarized relay Z*t* connected to the conductor 302 from the transmitter distributor circuit 63. Thus the armature *zt* of this relay Z*t* will be pulled toward its right contact for a mark, towards its left contact for a space, and remain in the center position shown for the transmission of a mutilated signal when conductor 302 is connected to a ground potential or carries no potential. Since the operation of armature *too* is twice as fast as that of armature *zt*, for a marking signal a positive potential from the positive terminal 411 will not be conducted through resistance R90, front contact *too*, conductor 412, right contact *zt*, and conductor 414 to terminal 3 to the high frequency radio transmitter until the last half of the signal element, to make a positive pulse for the duration of the operation of armature *zt*, which corresponds to the top first graph of Fig. 22. Similarly, for a spacing signal, positive potential to create the "space" pulse wave of Fig. 22 at the terminal 3 of the H. F. radio transmitter, will only be conveyed to said terminal 3 during the first half of the time element of the signal from terminal 411, resistance R90, back contact *too*, conductor 413, left contact *zt*, and conductor 414. In the event neither positive or negative potential is applied to conductor 302, indicating a mutilation is to be sent as is sent during the first eight-element signal time of the repetition cycle from the transmitter, then no potential is applied to conductor 414, in that the armature *zt* remains in its center polarized position shown and keeps the circuit to the H. F. radio transmitter open during this time of the operation of the element.

Other methods of modulation and transmission of the signals employed in this system may be used without departing from the scope of this invention. For example the signals may be transmitted over high frequency cables or transmitted directly over telephone cables without modulation on a high frequency carrier.

Although the foregoing description has been directed to one transmitter circuit and one receiver circuit, it is to be understood that similar circuits are employed at each of the stations in the system.

While there is described above the principles of this invention in connection with specific apparatus, it is to be clearly understood that this description is made only by way of example and not as a limitation of the scope of this invention.

What is claimed is:

1. In a communication system between two stations, each station having a transmitter for transmitting signals, a receiver for receiving said signals, each of said signals being composed of a plurality of constant length time division elements, there being controls rendering said elements distinctive in three different energy levels to read at both said transmitter and receiver at each station, two of said levels having a predetermined relationship to the third of said levels, one of said two levels being of marking element signal identity and another of said three levels being of spacing element signal identity, and said third level being of signal indication identity responsive to a special traffic condition in said system, means at each receiver for separately testing said elements in said signals, and means at each receiver to test the repetition of said signal if the level of one of said elements is different from that of said marking and spacing element levels.

2. In a multilation detection device for a signal communication system between two stations wherein said signals are composed of a plurality of elements, said elements in at least a part of said system comprising one of three different electrical conditions: two different pre-selected potential levels for traffic signals and the third being different from said two preselected potential levels, said system comprising: at each station; means to transmit said three conditions, means to receive said three conditions, said receiving means including means to test said elements separately to detect the third different level in a signal indicating that a traffic signal has been mutilated, and means to request the repetition of any traffic signal that has been mutilated.

3. A two-way traffic electrical communication system for signals effective between a plurality of stations, a transmitter and a receiver at each station, a definite plurality of equal time division elements constituting a whole signal comprising a predetermined number of said elements for traffic code signals and at least one special signal element, each station comprising a signal source coacting with a transmitter for traffic code signal operation, control means responsive a received element, means for forming a special element with one energy value corresponding to a regularity of reception in transmitting a correct reception indication to the transmitting station, means responsive to said one energy value of said special element for continuing the transmission undisturbed, means for forming said special signal element with a different energy value corresponding to irregular and mutilated reception, and means responsive to said different energy value of said special signal to delay the progress of said source and to initiate a repeat operation of the transmitter subsequent to the last preceding correct transmittal to the transmitting station from a receiving station.

4. In a mutilation detection and correction device for a signal communication system between two stations wherein said signals are composed of a plurality of elements all of which elements are of equal time duration, said elements in at least a part of said system comprising one of three different electrical conditions: two different preselected potential levels for traffic signals and the third being different from said two preselected potential levels, said system at each station comprising: means to transmit said three conditions, means to receive said three conditions, means in said receiver means to test said elements separately to detect said different level, and means responsive to said detection means to request automatically the reception by said transmitting means of the signal which contained the element that operated said responsive means.

5. In a code signal two-way communication system between a near and a far station wherein each whole code signal is composed of a plurality of elements, said elements of each whole code signal comprising: (1) code traffic signal elements of two different preselected electromagnetic wave conditions, and (2) a correct reception signal element consisting of one of said two different electromagnetic wave conditions, said system comprising: means to transmit said electromagnetic wave conditions for each said station, means to receive said electromagnetic wave conditions at each station, first detection means to detect the presence of said two electromagnetic wave conditions in said receiving means at each station, a second detection means to detect variations from said two electromagnetic wave conditions in each of said traffic signal elements at each station, a third detection means to detect variations from said one electromagnetic wave condition in said correct reception signal element at each station, means responsive to said first detection means to transmit from a near station a correct reception signal element to a far station, means responsive to said second detection means to transmit from a near station the absence of said one condition for said correct reception signal element to a far station, and means responsive to said third detection means at a far station to repeat automatically the whole code signal which caused the operation of said second detection means at said near station.

6. In an automatic two-way whole code signal communication system for sending and receiving messages between two stations having a transmitter and receiver at each station, each of said whole signals being made up of the same number of a plurality of time division elements, said elements of each signal comprising traffic signal elements, at least one synchronizing element for synchronizing the apparatus at said stations, and a special element for indicating the correctness of reception of another previous signal sent from a transmitting station, said system at each station comprising: means at each station for synchronzing the transmission and reception of the elements of each signal in response to said synchronizing element, means in each transmitter for storing at least the prior traffic elements of each signal to those elements of the one then being transmitted, means in each receiver for detecting mutilation of each traffic signal element received, means responsive to said detection means to effect a request for repetition of the whole signal which contains said detected mutilated element, and means to transmit said request over the special element of the signal being sent from the station that received the mutilated element to the station that transmitted the signal that has mutilated for repeating said signal that was mutilated from said storing means at that station without interruption of the traffic signal elements being sent from said station receiving said mutilated element.

7. In an electrical two-way communication system for a code of constant time division elements, the combination of at least two stations each of which has a transmitter circuit and a receiver circuit comprising: means at each station to store code signals before their transmission, means at each station to modulate successively the elements of each stored code signal for transmission to another station, means at each station to demodulate the elements received, means in each receiver circuit to test each of the traffic code elements of each signal received to determine irregularity and mutilation of any element in that signal, means to record the code signals of said tested elements, means at each station to communicate a special signal element with each traffic code signal to indicate the correct reception of traffic signals from another station, means at each station responsive to said special signal element to request the repetition of traffic code signals containing a mutilated element from another station, means at each station to repeat from said storing means the last signal transmitted therefrom, and means responsive to said repetition means at that station to stop the storing of additional traffic code signals on said storing means at that station and to repeat the signals already stored thereon until a complete correct traffic code signal has been received at the other station.

8. The system of claim 7 including condenser means to store the received elements of one signal until said elements are tested.

9. In a two-way traffic electrical communication system for whole code signals composed of an equal number of constant time division elements, a transmitter and a receiver at each station, comprising at each station: means for storing code signals before being sent, means at each receiver for testing said elements separately to determine if any element has been mutilated, means to return to each sending station a special signal element as part of each code signal indicating that either a correct or a mutilated whole code signal has been received from each code signal sent, means at one station responsive to a mutilation indication by said special signal element from another station and to prevent the storing of further code signals at said one station for sending and to repeat the signals already stored until the mutilated signal has been repeated, and means to prevent the storing and further transmission of new code signals at said one station until a special signal element has been received from said other station indicating correct reception of said repeated signal.

10. The system of claim 9 wherein said storage means comprises a plurality of condensers, one for each element of each signal to be stored, and contact tree means to distribute the charges to and from said condensers in synchronism with the operation of the system.

11. In a mutilation detection device for an electrical communication system for signals of the constant length time division type, said signals for traffic communication being transmitted at one of two different preselected electrical energy conditions, said system comprising: a receiver for said signals comprising, an integrating bridge circuit means to cause electrical conductivity of said bridge circuit in one direction in response to one of said conditions and conductivity in the other direction for the other of said conditions, means to detect which direction said bridge circuit is conductive, and means responsive to the non-conductivity of the bridge to indicate mutilation of a signal element because it had not been properly received.

12. The system of claim 11 wherein said bridge comprises two pairs of vacuum tube valves, only opposite ones of each pair being conductive at one time.

13. The system of claim 11 wherein said signals are frequency modulated and said means to cause said bridge circuit to be conductive are separate resonant circuits tuned to the two frequencies of the two preselected conditions.

14. The system of claim 11 wherein said signals are time modulated pulses and said means to cause said bridge circuit to be conductive comprise an oscillating contact synchronized with the divisions of the signal elements being received.

15. In a two-way electrical radio communication system for code signals composed of an equal definite number of three different time type modulated constant length time division elements, a receiver circuit and a transmitter circuit at each station for frequency demodulating and modulating respectively each element of said signals, comprising: a master transmitter station, a multivibrator in each said circuit tuned to half the frequency of the constant length time element frequency, means to connect the multivibrator of each receiver circuit with the multivibrator of the transmitter circuit at the same station, except at the master station, means to connect only one element of each signal to the multivibrator at the receiver circuit to synchronize said receiver multivibrator with the signals being received, whereby the circuits of the whole system are in synchronism with each other.

16. The system of claim 15 including means to transmit from said master station code signals having only one element different from all of the other elements in each signal until the circuits at the other stations of the system are in signal synchronism with said master station.

17. The system of claim 15 wherein said connection of the receiver to its multivibrator during said one of the elements of each signal maintains said multivibrator in phase with the received signal elements.

18. In an electrical radio communication system of a network of a plurality of stations for communication of traffic code signals over electromagnetic waves comprising an equal number of three different time type modulated constant time division elements, said system comprising: a transmitter at each station, means to modulate the traffic signals to be transmitted on a carrier wave, each transmitter having a different type carrier wave, separate receivers at each station for each other station in the network and being tuned to receive the carrier waves of each of the other transmitters, means at each receiver to record the traffic signals received by it, a special calling code signal repeatedly transmitted before a traffic message is transmitted to select the one other station of the network to which the traffic is to be transmitted, selector means in the receiver of every station tuned to the calling station adapted to respond to a given combination of elements corresponding to the calling code signal of that station to start the traffic recording means at that station, and means to by-pass said selector means during reception of traffic.

19. The system of claim 18 including means responsive to the repetition of said calling code signal for the called station after the traffic message has been received and recorded to cut-off said recording means thereby clearing that said station for calling signals and traffic from other stations.

20. In an electrical communication system of at least two stations for code signals composed of a definite number of constant time division elements of two preselected different electrical energy conditions, each station comprising a receiver circuit and a transmitter circuit, each of said receivers comprising: a receiving apparatus for demodulating an electromagnetic carrier wave modulated with said elements, a converter integrating bridge circuit to convert the demodulated signal elements into two different potential levels corresponding to said two conditions, a distributor means to store each of said elements of each signal in succession, a tester to test said stored elements, a printer for recording the code corresponding to the tested potentials of said elements, and a multivibrator having a frequency of half the frequency of said elements to synchronize the operation of said distributor, said tester and said printer.

21. In an electrical communication system of at least two stations for code signals having the same number of constant time division elements of two preselected different electrically reactive conditions, each station comprising a transmitter circuit and a separate receiver circuit for each of the other stations in the system, said transmitter circuit comprising: a keyer for converting mark and space traffic code signals into elements of corresponding different potential levels, a storage device for storing each element of at least two complete code signals, a converter generator circuit for converting different potential levels of said elements from said storage device into two corresponding different electrically reactive conditions, a transmitter distributor means for connecting successively each of the elements stored to said converter generator circuit, means for modulating said converted signal elements into a high frequency carrier electromagnetic wave and then transmitting said wave to another station, and a transmitter multivibrator having a frequency half that of the frequency of said elements and connected for synchronizing the operation of said transmitter circuit; and said receiver circuit comprising: means for receiving and for demodulating said wave into elements of corresponding different electrically reactive conditions, a converter integrating bridge circuit for converting said different conditions into corresponding different potential levels, a receiver distributor means for storing successively said levels of each element of one code signal, a tester and normalizer means for testing said stored elements and normalizing their potential levels successively, means responsive to said tester means for generating a special signal to the transmitter sending the tested signal to indicate whether any of the elements in each of the signals received has been mutilated and if all of the elements in any of the signals have been fully received, a printer for recording the code corresponding to said normalized potentials of each element, and a receiver multivibrator having the same frequency as the multivibrator of said transmitter circuit for synchronizing the operation of said distributor, said tester and normalizer, and said printer.

22. The system of claim 21 wherein said converter bridge circuit comprises two pairs of electron tubes connected in the legs of a bridge so that only one tube of each pair is conductive during the time interval for one element.

23. The system of claim 21 wherein said distributor means each comprise a relay counting chain controlled by the multivibrator of its associated circuit.

24. The system of claim 21 wherein said storage device and said storage means comprise condensers, one for each traffic element of each signal stored.

25. The system of claim 15 wherein said multivibrator has a frequency higher than that of said transmitter and receiver multivibrators and which higher frequency is variable by the different electrically reactive conditions corresponding to the signal elements to be transmitted.

26. The system of claim 15 wherein the multivibrator at one station of said system is a master multivibrator for controlling the synchronism of the whole system, and wherein said system includes connections between the receiver and transmitter multivibrators at every other station to insure in-phase synchronism of the circuits at each station.

27. In an electrical telegraphic communication system of a network of more than two stations for code signals having the same number of constant length time division elements of two preselected different electro-reactive conditions, each station comprising a transmitter circuit and a separate receiver circuit for each of the other stations in the system, said transmitter circuit comprising: a keyer for converting mark and space traffic code signals into elements of correspondingly two different potential levels, a storage device for storing each element of at least two complete signals, a converter generator circuit for converting different potential levels of said elements from said storage device into two corresponding different electro-reactive conditions, transmitter distributor means for connecting successively each of the elements stored to said converter circuit, means for modulating said converted signal elements into a high frequency electromagnetic carrier wave and for transmitting said wave to another station, and a transmitter multivibrator having a frequency of half that of the frequency of said elements and connected for synchronizing the operation of said transmitter circuit; and said receiver circuit comprising: means for receiving and demodulating said wave into elements of corresponding different electro-reactive conditions, a converter circuit for converting said different electro-reactive conditions into corresponding different potential levels, receiver distributor means for storing in succession said levels of each element of one signal, tester and normalizer means for testing said stored elements and normalizing their potential levels successively, a printer for recording the traffic code corresponding to the tested and normalized potentials of each element, a selector having a predetermined connection to said receiver distributor means for responding only to the calling code signal corresponding to its associated station, whereby said selector operates to connect said printer at the commencement of traffic code signals and to disconnect said printer at the end of said traffic code signals, and a receiver multivibrator having the same frequency as the multivibrator of said transmitter circuit for synchronizing the operations of said receiver distributor, said tester and normalizer, and said printer.

28. The system of claim 27 wherein said selector comprises a condenser which is charged by repetition of said calling code signal for said associated station and a selector by-pass relay which is operated by said condenser to by-pass said selector during the recording of traffic code signals for the selected station.

29. In an electrical communication system of at least two stations for code signals having the same number of constant time division elements corresponding to marks, spaces and variations from marks and spaces, each said signal comprising a definite plurality of traffic code elements, at least one synchronization element, and one special signal element, each station comprising a transmitter circuit and a separate receiver circuit for the respective other station in said system, said transmitter circuit comprising: a keyer for converting mark and space traffic code signals into elements of corresponding different potential levels, a storage device for storing each element of three consecutive whole traffic code signals, a converter generator circuit for converting different potential levels of elements to different electro-reactive conditions, a transmitter distributor means for connecting successively each of the stored traffic elements and said synchronizing elements and said special signal element to said converter generator circuit, a repetition device for controlling said storage device and said keyer to prevent further storage of traffic signals while the signals already stored are being reconnected to said converter generator for repetition, a transmitter multivibrator having a frequency of half the frequency of said elements for synchronizing the operation of said transmitter distributor means, said synchronizing element and the operation of said transmitter repetition device, and means for modulating said converted elements into a high frequency electromagnetic carrier wave and then transmitting said wave to another station;

and said receiver circuit comprising: means for receiving and for demodulating said carrier wave into elements of corresponding different electro-reactive conditions, a converter integrating bridge circuit for converting said demodulated elements into corresponding different potential levels, receiver distributor means for storing successively said levels of each traffic element of one signal and distributing the other elements of each signal, tester and normalizer means for testing said stored elements to determine their presence and normalizing the potentials of those which are so stored, successively, a printer for recording the code corresponding to said normalized elements of a complete traffic code signal, a receiver multivibrator having the same frequency as said transmitter multivibrator for synchronizing the operation of said distributor means, said tester and normalizer means, and said printer, and a receiver repetition device controlled by said tester means and said special signal element from said receiver distributor, means for sending via the associated transmitter circuit over said special signal element indications of the correct reception of the traffic elements and requests-for-repetition of traffic code signals in the event that said variations are detected by said tester, means responsive to special signals requesting repetition to operate said transmitter repetition device, said receiver repetition device also controlling the blocking of said keyer during the operation of said transmitter repetition device.

30. The system of claim 29 wherein said repetition devices each comprise a relay counting chain controlled by the distributor and multivibrator associated therewith to count once each whole code signal.

31. A system according to claim 29 comprising a means associated with said transmitter repetition device for transmitting an element corresponding to a variation from a mark and space element when said transmission repetition device has been operated to prevent the repetition of traffic signals when only the absence of said correct reception special signal element is detected.

References Cited in the file of this patent

UNITED STATES PATENTS

| | | |
|---|---|---|
| 1,888,268 | Hershey | Nov. 22, 1932 |
| 1,913,188 | Bruckel et al. | June 6, 1933 |
| 2,169,479 | Powell | Aug. 15, 1939 |
| 2,235,755 | Bakker | Mar. 18, 1941 |
| 2,242,196 | Thompson et al. | May 13, 1941 |
| 2,279,353 | Van Duuren | Apr. 14, 1942 |
| 2,395,515 | Stroller | Feb. 26, 1946 |
| 2,442,301 | Locke | May 25, 1948 |
| 2,495,652 | Coburn | Jan. 24, 1950 |
| 2,503,000 | Shanck | Apr. 4, 1950 |
| 2,505,728 | Zenner | Apr. 25, 1950 |
| 2,509,829 | Calvez | May 30, 1950 |
| 2,512,038 | Potts | June 20, 1950 |
| 2,518,405 | Van Duuren | Aug. 8, 1950 |
| 2,522,453 | Keyes | Sept. 12, 1950 |
| 2,575,268 | Griffith | Nov. 13, 1951 |
| 2,581,462 | Wright et al. | Jan. 8, 1952 |
| 2,584,739 | Rees | Feb. 5, 1952 |
| 2,623,123 | Matte | Dec. 23, 1952 |
| 2,706,215 | Van Duuren | Apr. 12, 1955 |

FOREIGN PATENTS

| | | |
|---|---|---|
| 149,752 | Australia | July 13, 1950 |